July 8, 1930.  L. GRUBER  1,770,032
METHOD AND APPARATUS FOR SHAPING CURVED SURFACES
Filed Sept. 14, 1928  9 Sheets-Sheet 5
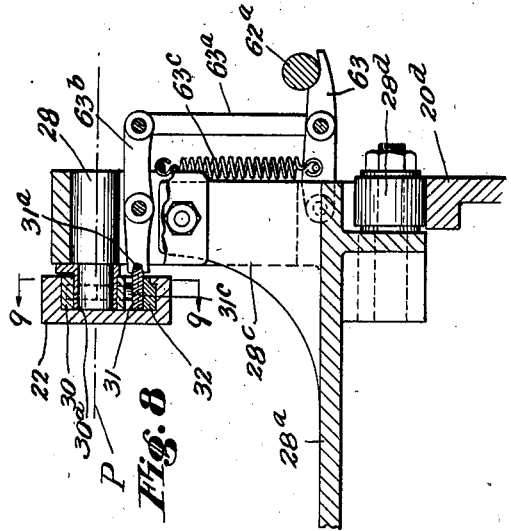
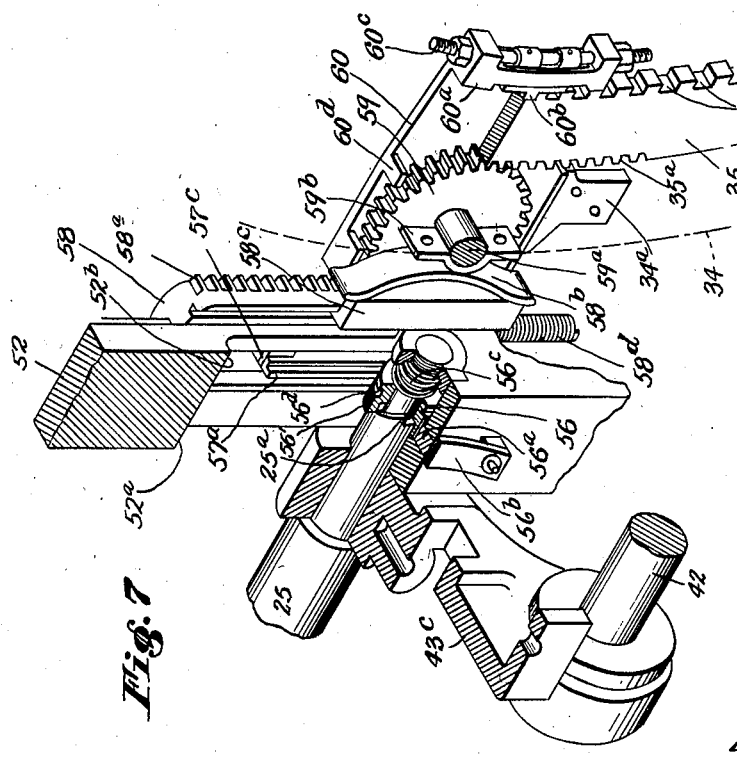
INVENTOR
Louis Gruber
BY
ATTORNEY

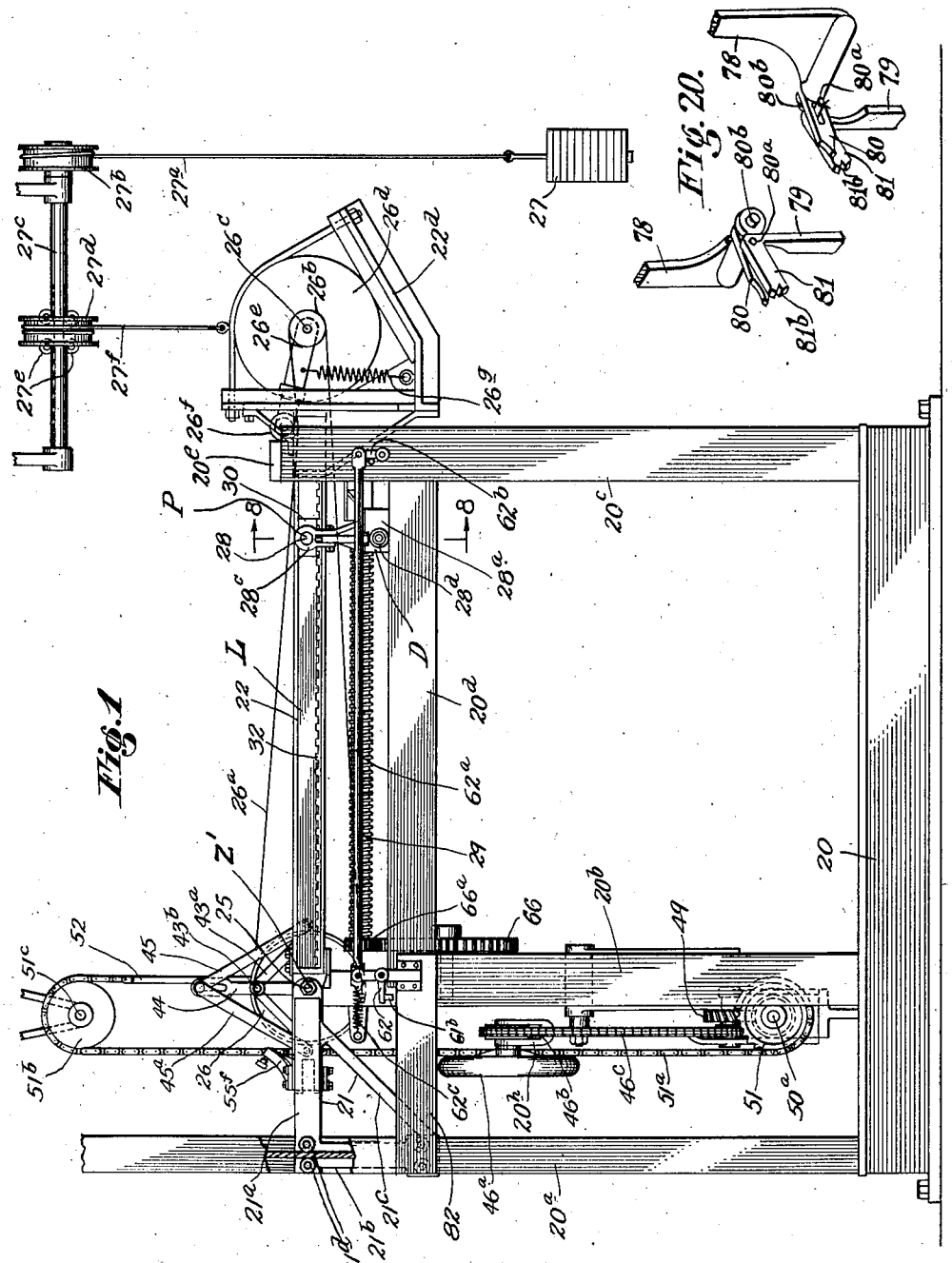

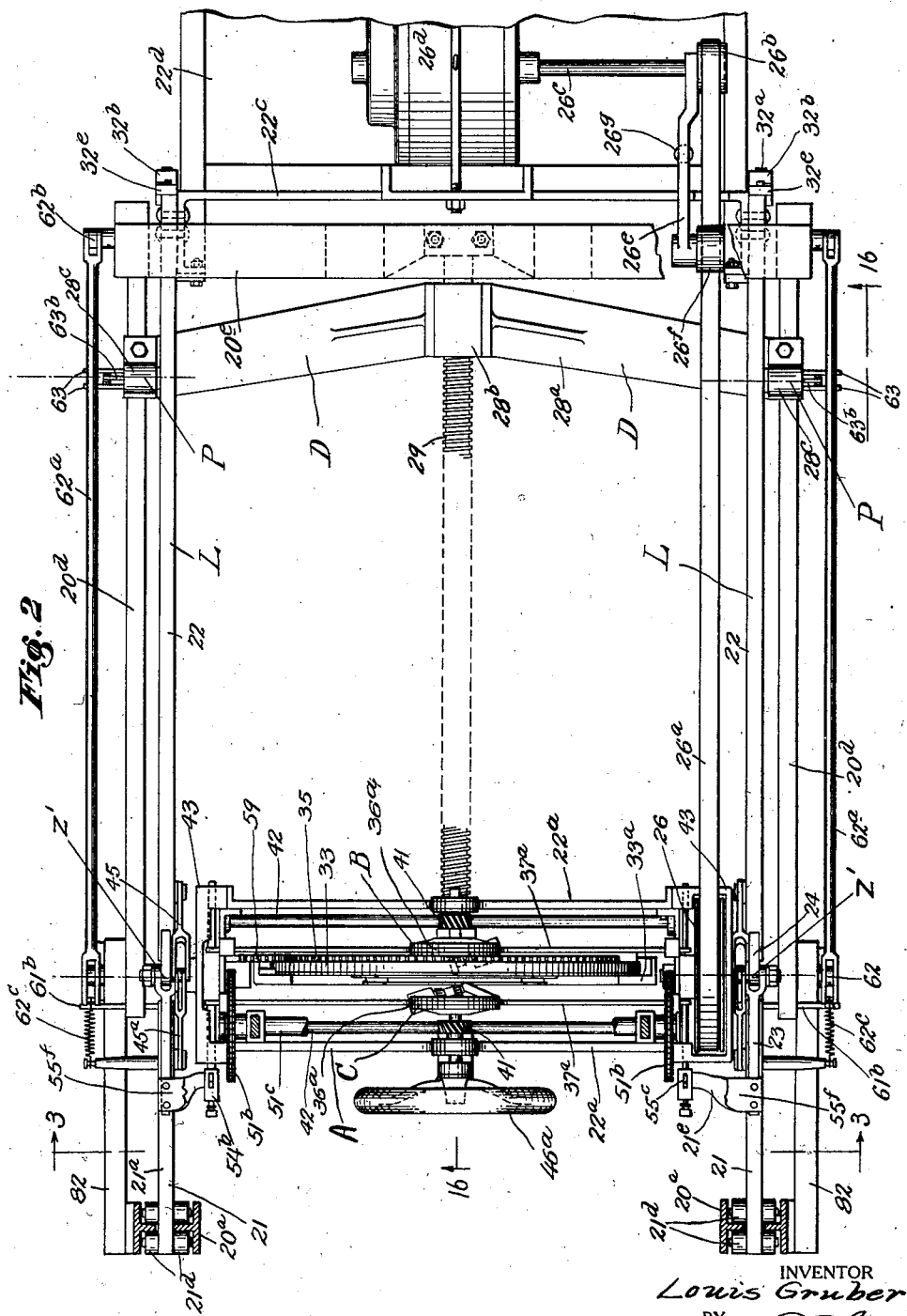

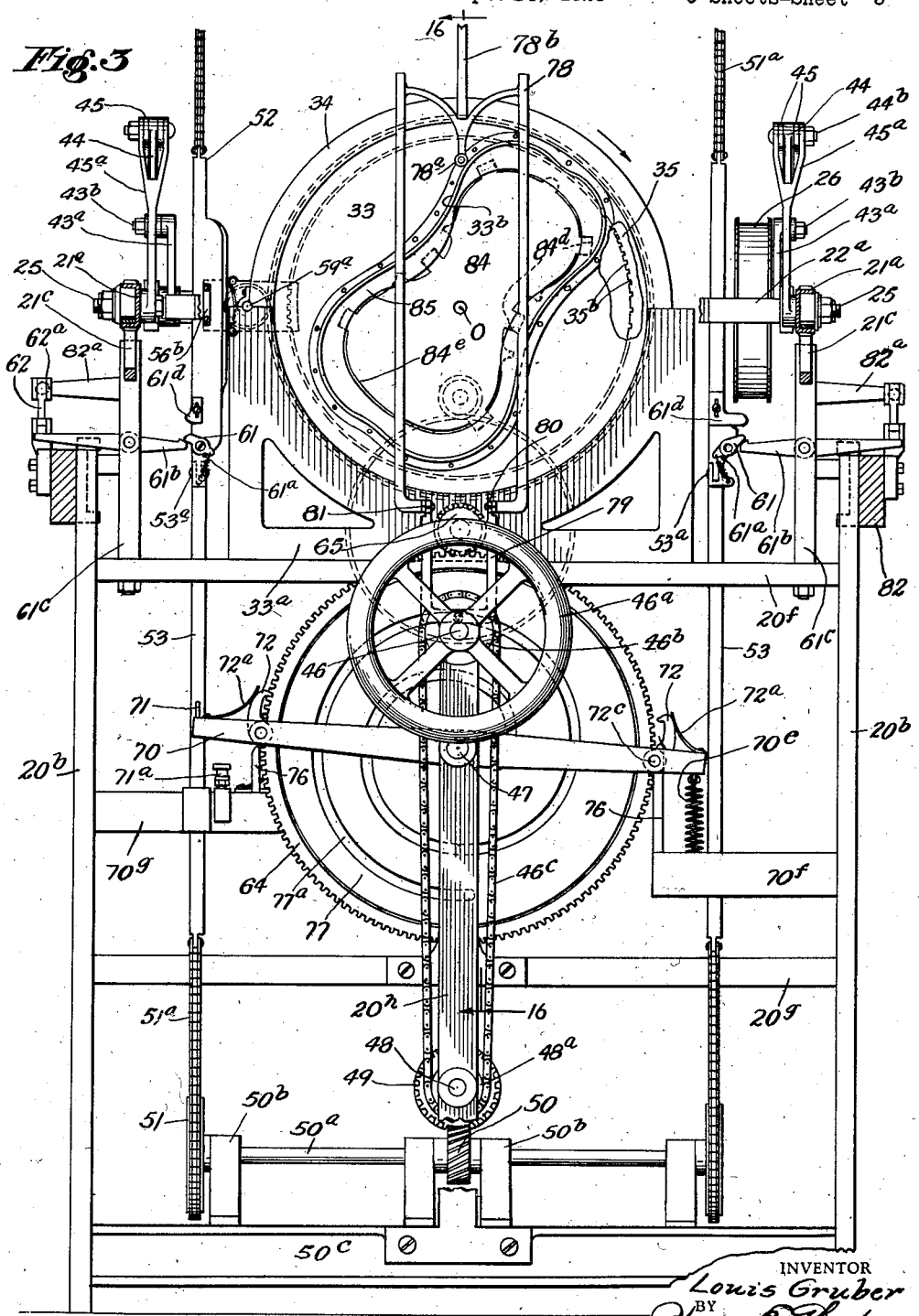

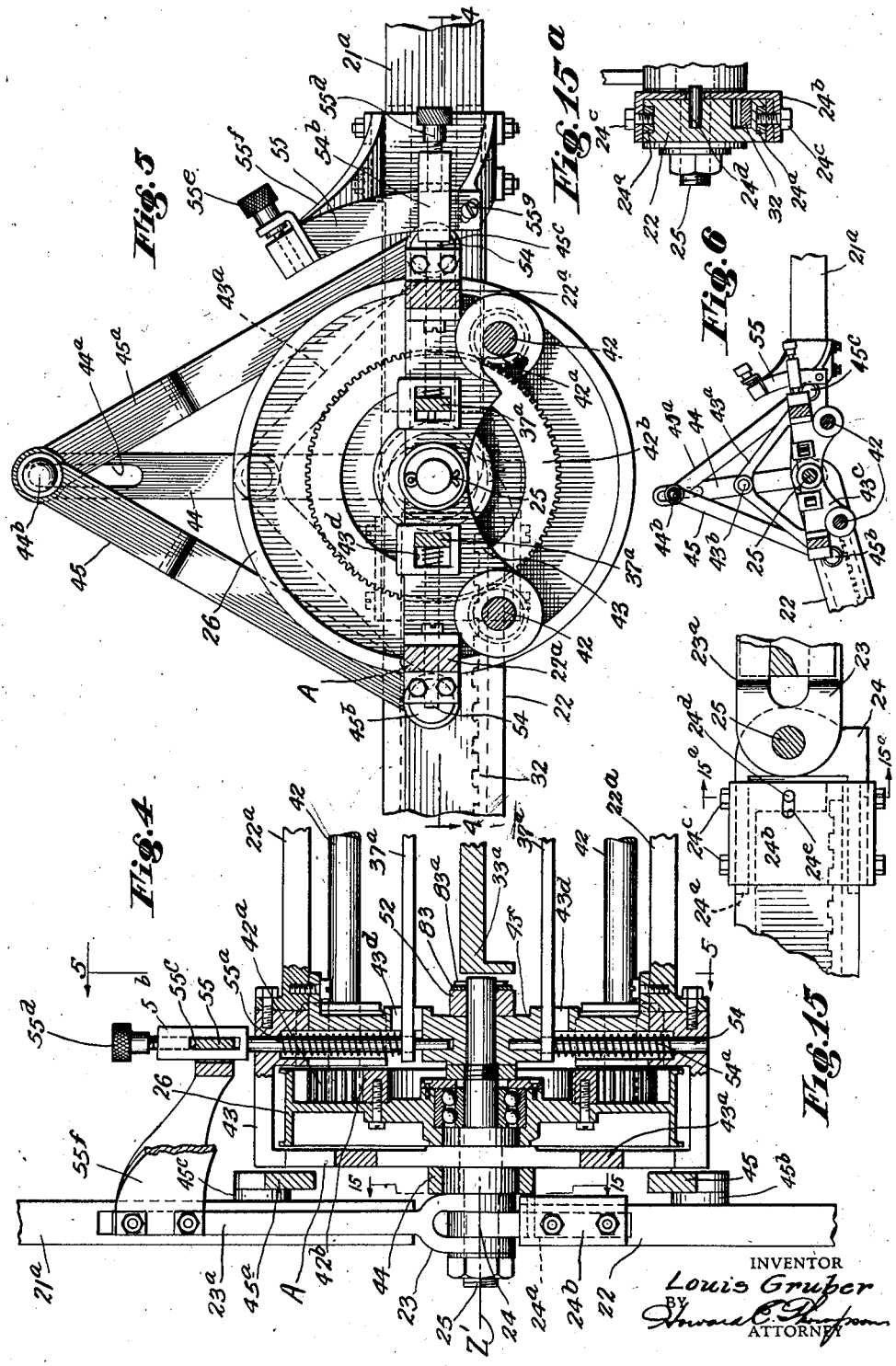

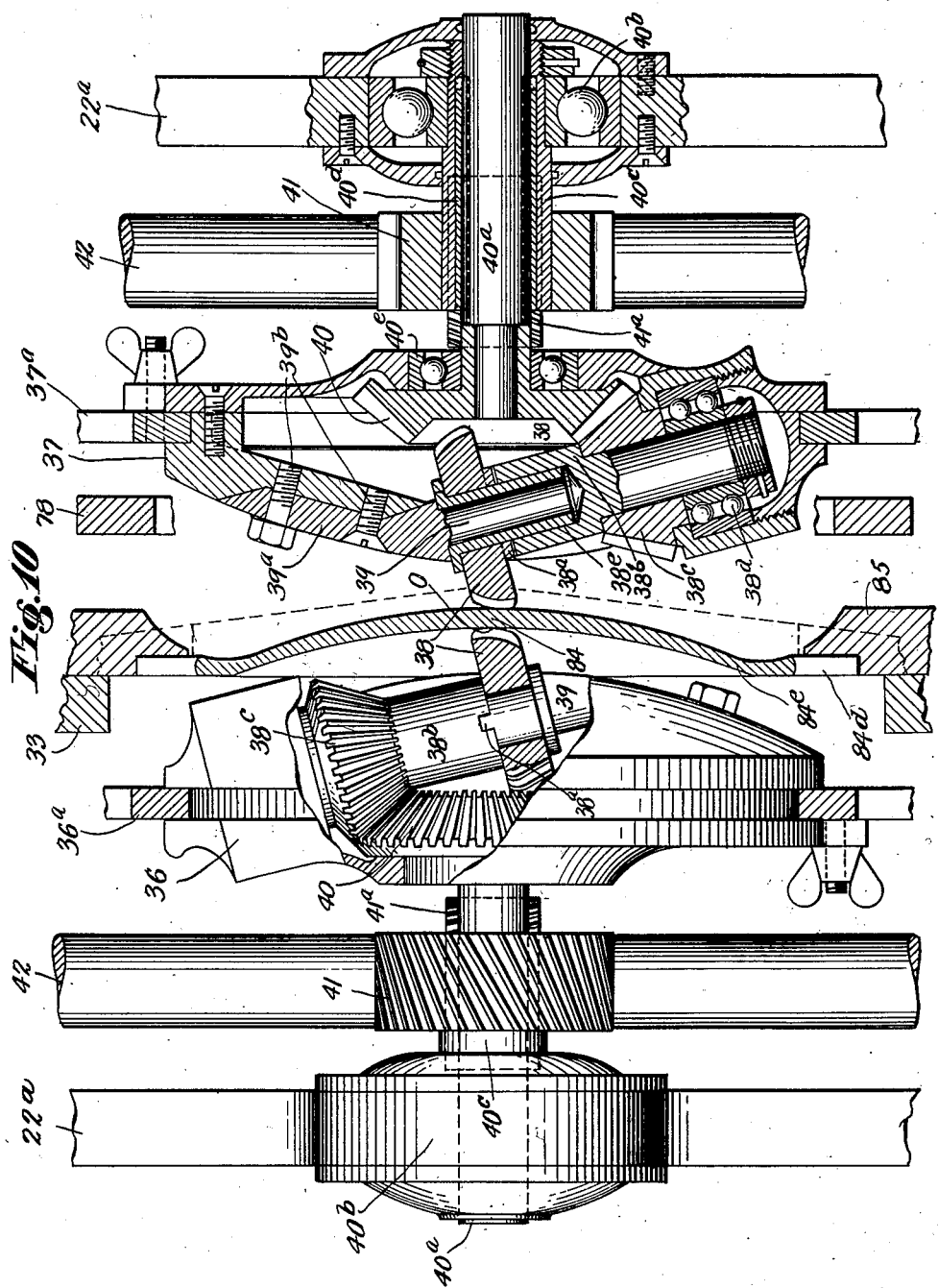

July 8, 1930. L. GRUBER 1,770,032
METHOD AND APPARATUS FOR SHAPING CURVED SURFACES
Filed Sept. 14, 1928 9 Sheets-Sheet 7

INVENTOR
Louis Gruber
BY
ATTORNEY

July 8, 1930.　　　　　L. GRUBER　　　　　1,770,032
METHOD AND APPARATUS FOR SHAPING CURVED SURFACES
Filed Sept. 14, 1928　　9 Sheets-Sheet 8
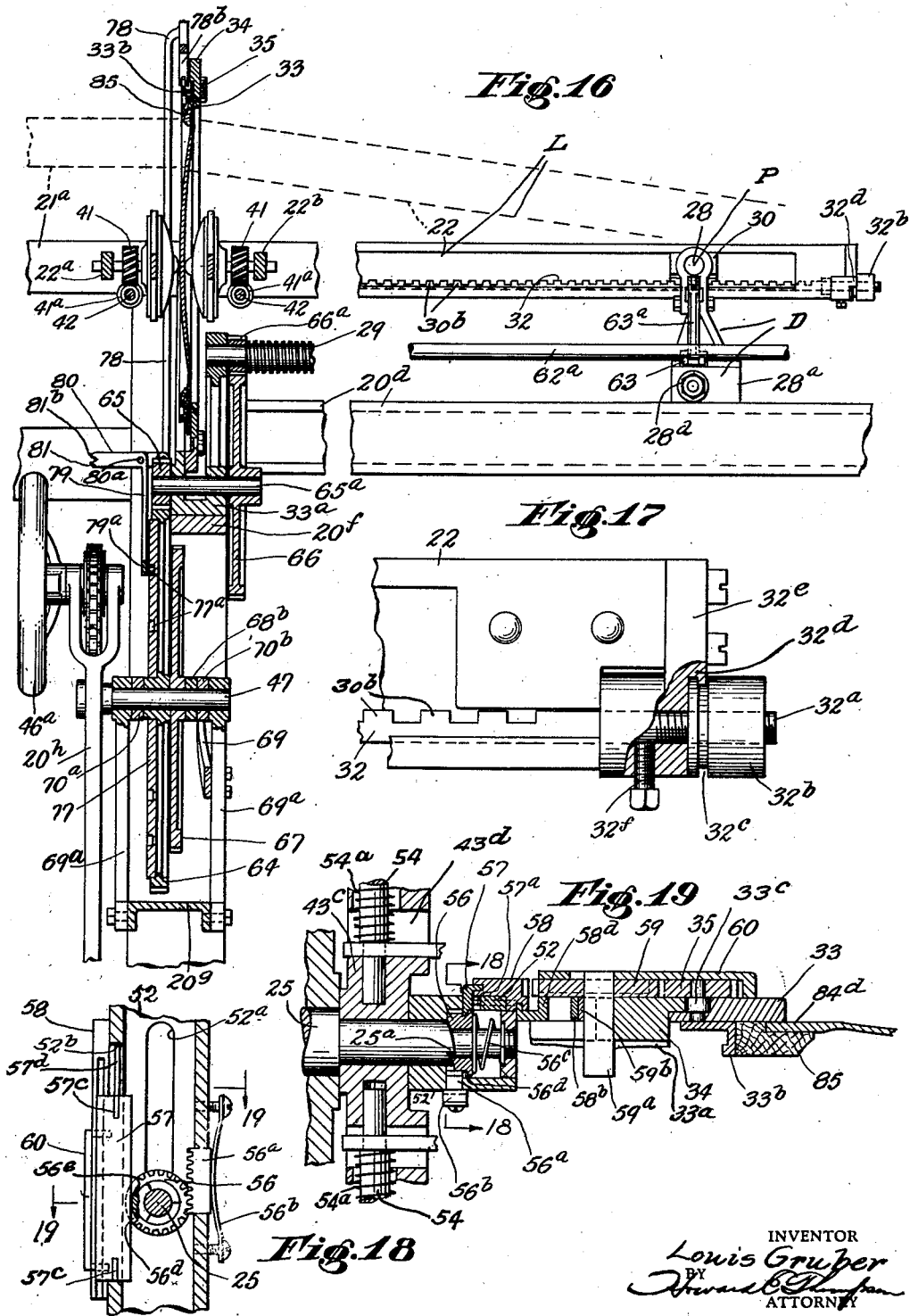

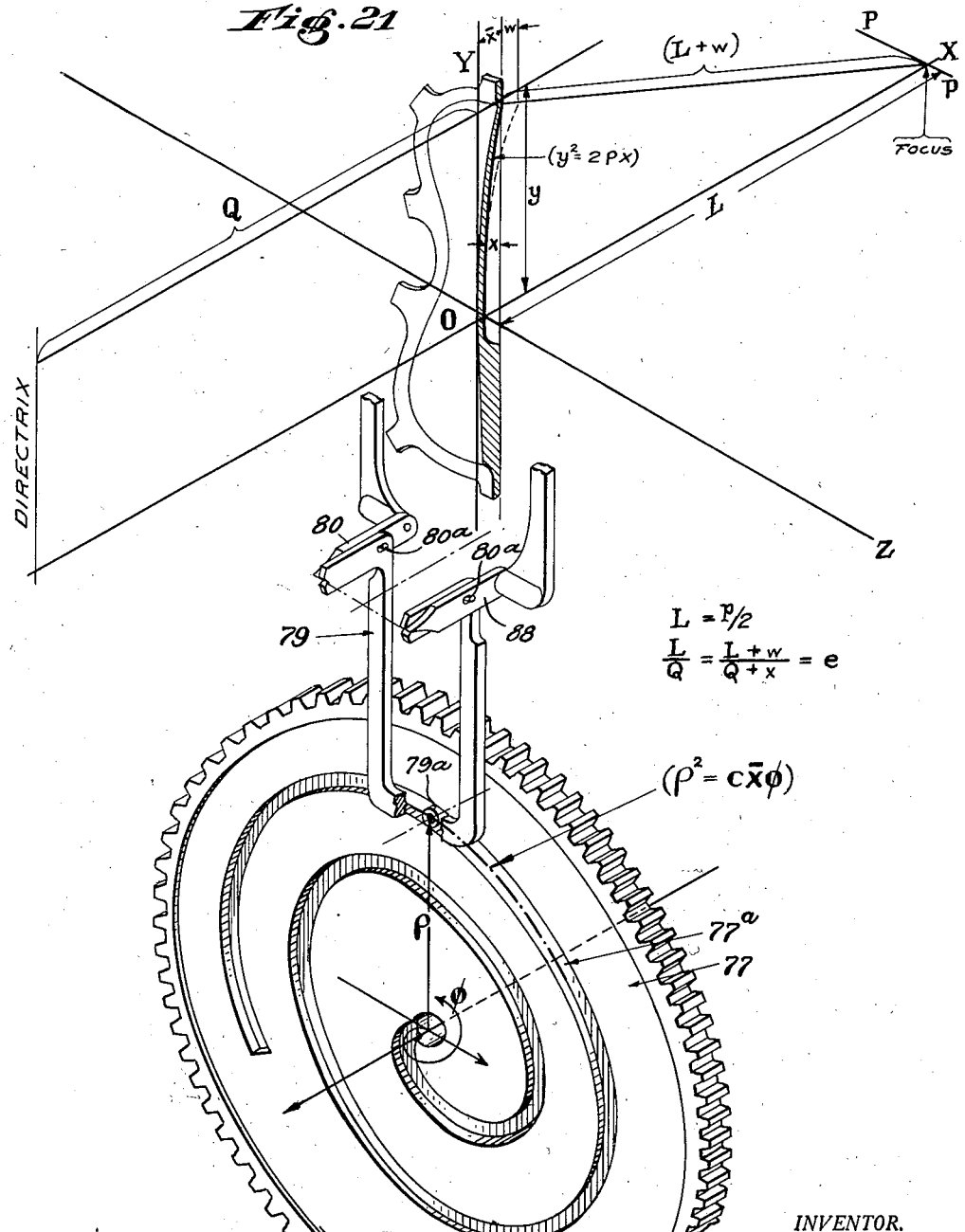

Patented July 8, 1930

1,770,032

UNITED STATES PATENT OFFICE

LOUIS GRUBER, OF NEW YORK, N. Y.

METHOD AND APPARATUS FOR SHAPING CURVED SURFACES

Application filed September 14, 1928. Serial No. 306,041.

This invention relates to shaping machines and more particularly to a machine for generating mathematically true surfaces of various cross-sections, especially quadric surfaces.

The principal objects of the invention are to provide a method and a machine which will simultaneously shape the two opposing surfaces of a workpiece to a curvature of prescribed mathematical formula—especially to any curvature of the conic-sections; to provide a machine for primarily generating any curve of the conics; to provide facile means for generating secondary curves in superimposition upon such primary curves to produce thereby resultant curves of almost any desired form within practical limitations; to provide shaping means for incorporating such generated curves into a workpiece; and to provide means for shaping workpieces to gaged thicknesses by bringing the two opposing points of the two generated surfaces into a precise and predetermined relation.

One special application of this invention is in the manufacture of sound boards for various instruments but more particularly for the bow-instruments and this fact shall serve in the following description as an example of effectively applying the principles of the invention.

The machine involves three main mechanisms, corresponding to its three main functions in the fashioning of these sound boards by the improved method, namely: A carving mechanism designed to carve both faces of the workpiece at once; a curve generating mechanism, controlling the action of the carving mechanism over that side of the workpiece which is to be concaved and a graduating mechanism, working in conjunction with the generating mechanism and controlling the second unit of the carving device in such a manner that every point along predetermined sections of the sound board shall receive a predetermined thickness at the instant of carving the same. In addition to these three main devices the machine is provided with means for actuating and controlling the various necessary mechanisms during a cycle of operation in the formation of a sound board.

Another object of this invention is to provide an improved method for fashioning sound boards of the above mentioned type in conjunction with the implied means. This method consists in carving a workpiece on its two faces at the same time, by means of two similar sets of carving devices, each cutting a relatively small radial portion on its respective surface as it moves outward to the periphery from one of two opposing, predetermined points at or near the center of each surface during a cutting stroke which these carving units perform at the end of a swinging lever. Furthermore, by this method, the concave surface of a sound board will be given predetermined curvatures of the same characteristics along sections taken from the relatively fixed center point to the periphery. Also, each such section of a sound board is to receive a predetermined, specific thickness that may vary from point to point over the entire length of the section.

In the production of bow instruments such as the violin, the viola, the 'cello, the double bass and the like, it has until now been necessary—especially in the case of high grade instruments—to carefully carve and adjust the thicknesses of the sound boards of these instruments by hand. Notwithstanding the skill of the artisans performing this long and tedious task, the resulting instruments cannot be considered perfect when compared with a more refined construction made possible by the evolution of means permitting a positive control over such factors as curvatures and thicknesses in the production of these sound boards.

The superiority of a generated surface over one made by the rule of thumb becomes evident on reflection that mass—as one of the two general factors affecting the acoustics of these instruments—will act detrimentally to the desired qualities of the resonator when it is needlessly present and that the adopted curved shape of these plates is made necessary by the intense stresses to which the sound boards of bow instruments are subjected. Yet, curvature per se is not desirable in these sound boards, as is proven empirically by the fact that unduly arched instruments of this kind compare unfavorably with those of medium arch construction in regard to their tonal qualities. In the construction of these sound boards two conflicting principles must be considered which are contained in the two propositions: (1) Flat sound boards will vibrate freer than curved ones; and (2) the required strength of these sound boards can be attained with a minimum of concomitant mass by giving them a curved construction. Sound practice demands a compromise between these principles and this can best be effected by assigning to each aforementioned raidal section of the sound board an appropriate, generated curvature, thereby attaining the required strength with a minimum of arch depth. But quite apart from these considerations is the fact that positive control over such factors as mass strength, etc., is unthinkable without definitely knowing the curvature of at least one surface of these plates. Finally, it may be expected that these curved surfaces act as impulse transmitting medium between the stressed molecules of the vibrating sound board and the adjacent layer of air and that a smoother transmission of sound energy will take place in case of a generated surface as compared with one of irregular form.

I attain the objects of this invention by the mechanism illustrated in the accompanying drawings, in which—

Fig. 1 is a side view of my machine, illustrating the general assemblage, omitting some of the mechanism and showing part of the structure broken away.

Fig. 2 is a plan and sectional view of the machine with some of the parts broken away or omitted.

Fig. 3 is a partial section on the line 3—3 of Fig. 2 with parts of the construction broken away.

Fig. 4 is a sectional plan view substantially on the line 4—4 of Fig. 5.

Fig. 5 is a partial section on the line 5—5 of Fig. 4.

Fig. 6 is a view, substantially similar to Fig. 5 to show the relative arrangement of these parts when in different position.

Fig. 7 is an isometric view and section of the controlling device for intermittently maintaining the workpiece holder in, and moving to position automatically.

Fig. 8 is a partial section on the line 8—8 of Fig. 1 on an enlarged scale.

Fig. 9 is a partial section on the line 9—9 of Fig. 8.

Fig. 10 is an enlarged plan view and section taken through the two cutter devices, with a section of the sound board between the two units.

Fig. 14 is a diagrammatic face view of the workpiece illustrating the method of carving the same.

Figure 11:
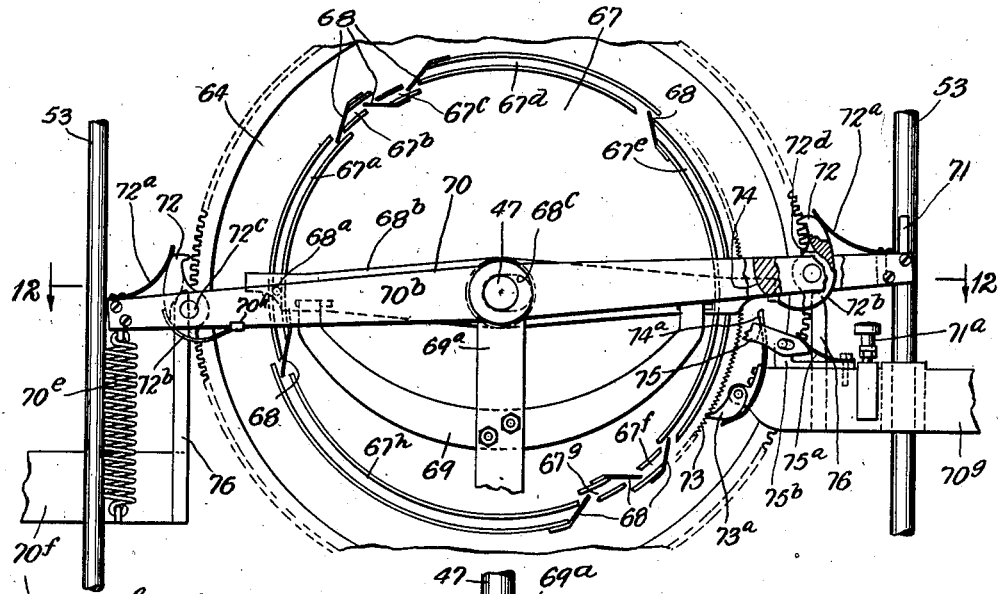
Fig. 11 is a view from the backside of a reversing mechanism which I employ.

Figs. 14$^a$, 14$^b$ and 14$^c$ are sections taken through the workpiece in the direction indicated in Fig. 14.

Fig. 15 is a side view of a joint shown in Fig. 4 on the line 15—15; this view also shows a stop employed on the machine.

Fig. 15$^a$ is a section on the line 15$^a$—15$^a$ of Fig. 15.

Fig. 16 is a partial sectional elevation on the line 16—16 of Fig. 2 and line 16—16 of Fig. 3, with parts of the structure broken away.

Fig. 17 is a side view of the rear end of one swinging lever arm which I employ.

Fig. 18 is a section on the line 18—18 of Fig. 19.

Fig. 19 is a sectional plan view taken on the line 19—19 of Fig. 18.

Fig. 20 is an isometric view of the joint of two indicator frames, shown in Figs. 3 and 16.

Fig. 21 is a diagrammatic view, showing a graphic illustration of the important axes, including symbols applied thereto and to indicate important parts, and further illustrating portions of the machine.

In the course of this description the following designating terms are repeatedly used and it is therefore deemed advantageous to define them at the outset once for all.

Independent surface;—by this shall be understood that surface of a sound board carved in the manner of this invention, which is to be primarily generated, in distinction to the dependent surface, which is subjected to the graduating process and therefore may be non-parallel to the opposing surface.

Point O is;—the origin of the reference-system, note Fig. 21. This point lies on the independent surface and it is identified on the machine as the origin of the radiating portions, which are, by the method of this invention, brought within the scope of a workstroke.

Axis X;—a reference axis passing through point O normal to the independent surface; this axis extends in longitudinal and horizontal direction of the machine, relative to which it is fixed; during carving, the workpiece intermittently revolves around this axis.

Axis Y;—a reference axis passing through point O in a direction vertical and perpendicular to axis X.

Axis Z;—a reference axis passing through point O in a direction perpendicular to the XY-plane.

Abscissæ or ordinates, if mentioned, shall have reference to these rectangular axes.

Front side of the machine;—that view of the machine which an observer faces when looking upon the surface of the positioned workpiece which is to be convexed.

The invention consists in the main of the three already mentioned mechanisms, namely: the curve generating device, the carving device and the graduating device, and of the devices which move, feed and control the aforementioned main devices. Of these there are: (4) The mechanism for propagating the power applied at the hand wheel for actuating the various devices. (5) The mechanism for automatically reversing the direction of pivots 28—28 travel. (6) The controlling device for intermittently maintaining the workpiece-holder in, and moving to, position. (7) The pivot setting mechanism, which sets and controls the position of the pivots 28—28 and locks them to the lever frame L automatically. (8) Necessary mechanisms not classified.

The main frame of the machine consists of a base portion 20, of oppositely disposed vertical frame members $20^a$, $20^b$ and $20^c$, joined by horizontal side frame members $20^d$ and 82, and by a top transverse member $20^e$. The frame members $20^b$ are also joined by transvrse frame members $20^f$ and $20^g$. (See Fig. 3). On both sides of the machine is a vertically movable cantilever bracket 21, guided in its movement by eight rollers $21^d$, said rollers running on the webs of the posts $20^a$.

*(1) The curve generating device. (Figs. 1, 4, 5 and 6.)*

The purpose and operation of the generating device is fully described further below; it shall here be merely stated that this device guides the carving unit B so that this unit will carve a predetermined curvature along its path on the independent surface of the workpiece, and fulfills a primary function for the graduating device, (later to be described). For this purpose, a pair of toggles or link systems are disposed oppositely on the terminals of lever arms 22, one to each arm. (Fig. 1). Each link system is composed of six kinematic pairs of elements, two of which are slidably connected and the other four rotatably. The link systems are closed. As this mechanism is alike for both sides of the machine it will be described for only one side.

Each link system is composed of link 45, link $45^a$, of the two sliding links 23 and 24, the bracket 21, and the lever frame member 22. Link 45 is connected by joint $45^b$ with the inside of lever arm 22 and by joint $44^b$ with the similar link $45^a$. (Figs. 4 and 5). Link $45^a$ has its second joint connection at the joint $45^c$ on the inside of a beam $21^a$ of the bracket 21. The members 23 and 24 are joined by a stub shaft 25 and terminate each in a pair of parallel rods $23^a$ and $24^a$ respectively; these rods are of rectangular cross-section and slidably engage in spaced corresponding recesses near the terminals of the respective member, that is, $23^a$ in the recesses of the beam $21^a$ and $24^a$ in the recesses of the lever member 22. By this arrangement, both the lever arm 22 as well as the beam $21^a$ are extended by a potentially variable length, which in the case of the beam reaches a maximum extension equal to the depth of the sound board for which arc depth the symbol $\bar{x}$ shall be used throughout the following description.

A swinging frame, consisting in part of the above mentioned channel-shaped side members 22, is pivotally supported upon two pivots 28—28, which are movably in direction perpendicular to the ZY-plane and are in alinement on a common axis P—P, parallel to transverse axis Z. Pivots 28—28 and axis P—P lie always in the XZ-plane and they divide the swinging frame into a positive or working part which shall in the following be known as the lever frame L, and into a negative part lying to the rear of the axis P—P. The ends of the positive frame part are joined by what in the following will be termed the oscillating frame A; said frame carries the carving devices and part of the graduating mechanism and is connected with, and oscillated by, the generating mechanism. The two members 22 of the swinging frame have their channels directed outwardly and are connected in the rear by the transverse member $22^c$, to which member is attached a motor supporting table $22^d$, carrying cutter-drive motor $26^d$. The lever frame L must also be considered as a part of the generating device.

The two cantilever brackets 21, one to each side of the machine, are also a part of the generating device. Each consists of the horizontal beam $21^a$, a vertical member $21^b$, and a brace $21^c$. Each of these brackets responds to the swing of the lever frame L—with which they are connected by the joints of the toggle systems—by a rise and fall in a vertical direction; they are restrained and aided in this motion by guide rollers $21^d$, running on the webs of the posts $20^a$. (See Fig. 2). The upward swing of the lever frame L is terminated by a stop $24^d$ note Figs. 15 and $15^a$ operating in a slot $24^e$ of a channel-shaped member $24^b$, which is secured to, and moves with, the rods $24^a$. The principle governing this stop is the fact that all curves generated in the manner of this invention have a common arc depth $\bar{x}$ for all ordinates terminating on the periphery of the surface to be carved.

The oscillating frame A is pivoted upon axis Z' by means of the two stub shafts 25 which have this transverse axis in common. Each side of the frame A has a bracket 43 with upwardly directed flanges 43ª and an upwardly directed slotted lever 44; said lever 44 is coaxially disposed with the frame A on stub shaft 25 and also perpendicularly to the plane of this frame by means of a bolt 43ᵇ, connecting it with flange 43ª. In the slot of this lever 44 operates slidably the pin of joint 44ᵇ. Another bracket 43ᶜ see Fig. 4, is bolted to bracket 43 and carries the bearings for shafts 42. The frame A consists furthermore of two rods 22ª, each bolted at its terminals to the oppositely disposed brackets 43; of four spindles 54, slidably arranged in sockets 54ᶜ on brackets 43 and 43ᶜ; of two rods 37ª, with a ring-shaped middle portion 36ª. These rods 37ª are fastened at their terminals to the spindles 54 and slide with them in supporting the gear housings 36 and 37 of the cutter devices, while the springs 54ª in pressing against these rods, press also the cutter devices with yielding pressure against the workpiece during the carving operation. Openings 43ᵈ are provided in brackets 43ᶜ to permit the above mentioned sliding of rods 37ª to take place. As the right hand bracket 43 accommodates a belt driven pulley 26, it is somewhat different from the otherwise similar bracket 43 on the left hand side of the machine.

(2) *The carving device.* (*Figs. 2, 10 and 16.*)

Disposed centrally upon frame A and at opposite sides of the workpiece supporting table 33 are movable cutter devices B and C, constituting the carving mechanism of the machine. As each of these devices is of substantially the same construction, like references will apply to like parts of each device.

Each of these carving units consists of a gear housing, composed of the two parts 36 and 37, holding in position a set of bevel gears 38ᶜ and 40. The pinion shaft 38ᵇ has an enlarged end portion which is hollowed out to receive bushing 38ᵉ and the round end 39 of a support-giving angular piece 39ª, which is itself bolted to the housing part 37. The cutter tool 38 rotates with the pinion shaft with which it is connected by means of a lug 38ª projecting into a corresponding recess in the shaft. Bearing 38ᵈ supports the other end of the pinion shaft 38ᵇ. Each gear housing is supported by means of a ring 36ª fitted into a corresponding groove surrounding these housings thus permitting a setting of the cutter tool for a turn in any desired direction and two arms 37ª, said arms extending laterally in symmetrical arrangement from the ring outward to slidable carrier spindles 54. (Note Fig. 4.) These housings are therefore slidably supported.

The shaft 40ª of bevel gear 40 too is slidably arranged by means of two featherkeys 40ᵈ inserted longitudinally in the shaft and in corresponding slots in a surrounding, non-slidable sleeve 40ᶜ; said sleeve receives rotary motion by means of a helical gear 41, keyed to it, from another helical gear 41ª, which itself is keyed to a drive shaft 42; this shaft is run by a pinion 42ª meshing with a gear 42ᵇ secured to a belt driven pulley 26. (See Figs. 4 and 5.) The belt 26ª receives its power from a motor 26ᵈ carried by the negative end of the swinging frame L. The shaft 40ª is furthermore supported by a bearing 40ᵇ, which bearing is centrally arranged on the member 22ª of frame A.

By this arrangement, each carving unit is given a certain limited freedom to slide in a direction perpendicular to the generated instantaneous point on the independent surface. Provision for such movement is made necessary to meet the conditions existing in the first stages of the carving operation when the cutters will be separated from the intended surface by the surplus material which is to be carved away from the work piece. A further reason for this arrangement is to permit the carving unit on the surface of the workpiece to be convexed, to respond in movement to the contour of the graduating cam, as will be described. As these carving devices are entirely carried upon the frame A, it follows that they must not only execute the swinging movement which this frame undergoes by virtue of its attachment to the ends of swinging lever frame L, but also partake of the oscillations of this frame A around the instantaneous axis Z'. The effect of these oscillations—as will be shown— an application of these carving devices normal to any point of the generated curve at the instant of carving a point section.

*The graduating device.* (*Figs. 2, 4 and 5.*)

There are two similar devices installed on the machine, one on each side, as is the case with the generating device. The function of the device is to regulate the thickness of a point section of the forming sound board at the instant of carving the same. This device controls the movement of the carving unit on the side of the sound board to be convexed, in so far as such movement is perpendicular in direction to the intended concave surface.

Each pair of rods 23ª, sliding in the recesses of the respective beam 21ª, have fastened to them a bracket 55ᶠ which bracket thus necessarily slides with the rods 23ª and rises and falls with the beam 21ª. This bracket carries a graduating cam blade 55 fastened rigidly to it. Two of the sliding spindles 54 are used in connection with the graduating device and these have a portion near one end enlarged in diameter so as to permit this portion 54ᵇ to be slotted; inside this slot the cam blade 55 operates. Inserted through the end of the enlarged portion 54ᵇ and projecting into the slot is an adjustment screw 55ᵈ forming a follower point 55ᶜ; said follower point being constrained to stay in contact and move over the peripheral edge of the cam blade 55 by the spring 54$^a$. This adjustment screw also permits the adjustment of the initial thickness which is to be carved at the point section at O of the workpiece. Cam blade 55 has a bent wing at its upper terminal to facilitate adjustable connection with the bracket 55$^f$ by means of another adjustment screw 55$^e$ and an adjustment slot 55$^g$ below. The adjustment screw 55$^e$ serves to modify the eccentricity of the cam 54 with respect to the axis Z'.

As the operation of this device is fully described further below it shall here be merely mentioned that the movements of the cam blade 55 with the beam 21$^a$ and the sliding rods 23$^a$ correspond to the values of the ordinate $y$ and the abscissæ $x$ respectively, of the instantaneous point to be generated on the independent surface; also, that the oscillations of the frame A on the instantaneous axis Z' supply the motive force for the required reciprocating movement of the respective spindles 54 in their sockets, provided a cam 55 of periphery eccentric with respect to axis Z' is used.

(4) The mechanism for propagating the power applied at the hand wheel for actuating the various devices with the exception of the carving device, which is run by the motor. (See Figs. 1, 3 and 16.)

The inception of the movements of this mechanism is the movement of the hand wheel 46$^a$ by the operator. This hand wheel is mounted upon a shaft 46 and supported by the upright member 20$^h$. Shaft 46 has keyed to it a sprocket wheel 46$^b$, said sprocket gear being paired with another sprocket wheel 48$^a$ below, by means of the chain 46$^c$. The shaft 48, carrying sprocket 48$^a$, has keyed to it also a helical gear 49, in mesh with another helical gear 50, carried upon shaft 50$^a$ directed transverse to the machine. Each end of shaft 50$^a$ carries a sprocket gear 51 while a similar shaft 51$^c$ directly overhead has similar sprocket gears 51$^b$ freely revolving upon its ends. Each pair of sprockets 51—51$^b$ are joined by a continuous chain which consists of a sprocket portion 51$^a$ and two rods 52 and 53. By these described means an up—or down—movement can be given to the rods 52 and 53 by a turn of the hand wheel.

Each rod 52 has a slot-like opening through which the inner end of a stub shaft 25 on frame A project. The frame A rests normally upon supports on the machine frame in such a position that its central horizontal plane coincides with the XZ-plane already defined. The upward movement of the rods 52 will therefore carry these stub shafts and with them the frame A along. As the members 22 of lever frame L and the beams 21$^a$ of the two cantilever brackets are joined to the stub shafts, they too will respond to the up movement of rods 52 in accordance with the freedom conceded to them, i. e., the beams 21$^a$ will rise vertically and the lever frame L will swing upwardly upon its pivots 28—28. These conditions furthermore demand a sliding of members 23 and 24 in their respective recesses on beams and lever by an equal amount. The upward movement of rods 52 is terminated by the stops 24$^d$. The return movement—accomplished by a reverse turn of the hand wheel—will restore the frame A to its starting position. It will thus be seen that a workstroke consists of a curvilinear movement of the carving devices upward to the peripheral points on the intended independent surface of the positioned workpiece and a return movement to the XZ-plane.

The slot 52$^b$ in each rod 52 permits a continuation of the down movement of these rods after deposition of the frame A in its starting plane and it is this down movement which supplies the motive power for the automatic actuation of the various mechanisms, as will be described.

Figure 12:
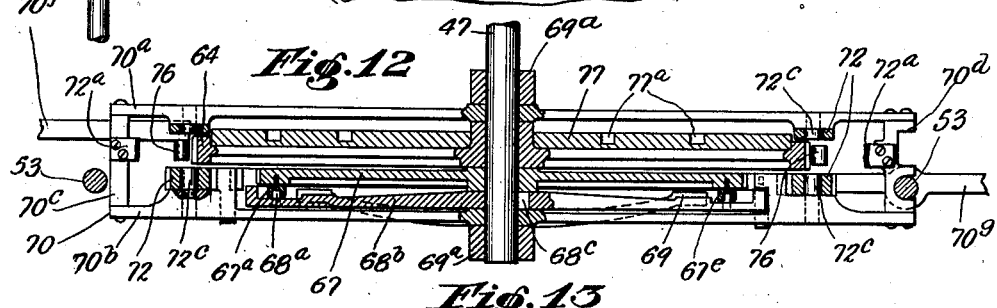
Fig. 12 is a sectional plan view of the structure shown in Fig. 11, taken on the 12—12 of said figure.

Supported by the two upright frame members 69$^a$ and additionally by member 20$^h$ is a shaft 47 carrying loosely the comparatively large gear 64 and a drive frame 70. (See Figs. 3 and 12.) This gear 64 is one member of a gear train which intermittently moves a carriage D; the other members of this gear train are pinion 65 and gear 66, both keyed to shaft 65$^a$ and the pinion 66$^a$ with the drive screw 29 to which it is keyed. The forward end of this screw is supported by frame bearing 33$^a$. The carriage D can be propelled forwardly or reverse by a turn of the screw 29 and therefore also by a turn of gear 64 and it serves as a means of positioning the pivots 28—28 in which lies axis P—P of the lever frame L.

This carriage D consists of a nut 28$^b$, in threaded engagement with screw 29, to which are bolted laterally extending and forwardly inclining arms 28$^a$; each arm 28$^a$ is provided at its outer end with a shoulder stud to serve as axle for roller 28$^d$; said rollers supporting the intermittently moving carriage through tracks 20$^d$. (See Figs. 2 and 8.) Extending upward above the rollers are bearing brackets 28$^c$ on which the pivot pins 28 are mounted.

Figure 13:
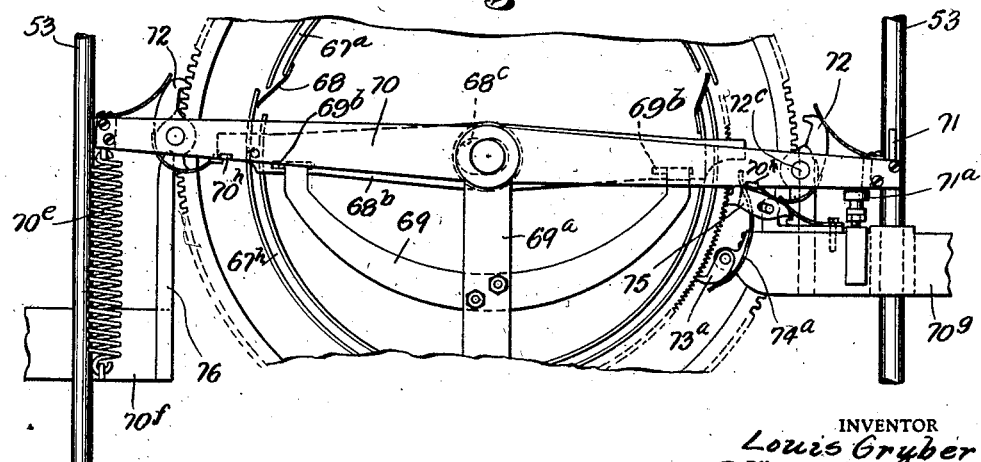
Fig. 13 is a similar view as in Fig. 11 with the name parts in different positions.

The intermittent turn of gear 64 by a sufficient amount is effected by means of a striker plate 71 on the left hand rod 53; as this rod moves downwardly by the distance allotted to the slots 52$^d$ said striker plate 71 causes the downward swing of the respective end of the rockably mounted drive frame 70, until this swing is terminated by the adjustable stop 71$^a$. (See Figs. 11, 12 and 13.) The return swing of drive frame 70 is assured by tension spring 70$^e$ on the other or right hand end of this frame and is limited by stop 70$^f$. Frame 70 consists of side bars 70$^a$ and 70$^b$ coupled at their ends by members 70$^c$ and 70$^d$ and the side members carry pivot pins 72ᶜ near each end to which the two hooks pawls 72 are hinged. During a series of oscillations of the drive frame 70, one of the pawls 72 will intermittently spring into engagement with the teeth of gear 64 at the beginning of each downward swing and disengage near the end of this swing for a disengaged return swing with the effect of a one-directional drive of gear 64 and through this a like travel of pivots 28—28. During this series of oscillations of frame 70 one pawl 72 remains disengaged due to engagement of pallet 72ᵇ in notch 70ʰ of frame member 70ᵇ. When, however, the rotating work-piece reaches a position which demands a reverse drive of the gear 64 then the reverse mechanism reverses the order according to which the two pawls 72 have been functioning, (as will be described under reverse mechanism).

The descent of the pawl 72 that happens to be engaged brings a cam surface 72ᵈ on its inner edge into contact with a similar cam surface on an upwardly directed finger 76; by the resulting cam action the pawl is moved out of engagement with gear 64 and also kept out of engagement by the pallet 72ᵇ with notch 70ʰ. At the termination of the return swing the functioning pawl 72 has its pallet 72ᵇ knocked out from the notch 70ʰ by the active end of a reversal bar 68ᵇ, whereupon the pawl is sprung back into engagement with gear 64 by spring 72ᵃ. In this connection, it is necessary to consider the relation that an angular displacement of gear 64 has with the spacing of the notches on a locking rack bar 32 (later to be described).

(5) The mechanism for automatically reversing the direction of travel of pivots 28—28. (See Figs. 11, 12 and 13.)

The whole surface to be carved on the workpiece can be divided into a number of segments all having as common converging point the central point O. If for the dividing lines of these segmental portions are chosen lines of such radial length from point O to the non-concentric periphery of said surface as will separate a series of increasing radial distances from one of decreasing radial distances, then these lines will mark positions requiring a reversal of pivot 28—28 travel from one of given direction. The reverse mechanism functions to bring this reversal of pivot travel about automatically.

Loosely mounted on shaft 47 and adjacent to the back face of gear 64 is a reversing disk 67; the periphery of said disk is provided with ratchet teeth 73 in which a spring actuated pawl 73ᵃ operates to prevent any but a clockwise rotation of this disk which intermittently is advanced by one tooth space in said direction upon each downward swing of drive frame 70; to accomplish this advance, frame member 70ᵇ is provided with a cam surface 74, adapted to strike one end of a spring 74ᵃ whereby the driving pawl 75 is moved into engagement with the teeth 73. The spring 74ᵃ normally holds the pawl 75 out of engagement with the disk 67; another spring 75ᵃ is employed to aid in the action of said pawl as it slides in its pivotal slot in and out of engagement with teeth 73. These elements are supported by brackets 75ᵇ and 70ᵍ, the last mentioned being part of the machine frame.

Arranged on the inner face of the reversing disk 67 and near its periphery are a number of cam tracks 67ᵃ, 67ᵇ, 67ᶜ, 67ᵈ, 67ᵉ, 67ᶠ, 67ᵍ and 67ʰ; these cam tracks are spaced in paths concentric with the axis of disk 67 but alternatingly at one of two slightly different radial distances from this axis. Spaced intermediate the adjacent ends of the separate cam tracks are guide springs 68 for guiding the pin 68ᵃ of the reversing bar 68ᵇ from one cam groove to another during the cycle of revolution of the disk 67. The bar 68ᵇ is supported by the ends of a curved bracket 69, passing through slotted openings 69ᵇ, and by the shaft 47, also passing through a slot 68ᶜ; these three slotted supports permit a transverse movement of the bar with respect to the machine, such movement being in response to the pin 68ᵃ travel from one cam track to the other at their junction.

Only one end of the reversal bar 68ᵇ functions at a time to knock the respective pallet 72ᵇ out of its restraining notch 70ʰ; the sliding endways of the bar will cause the other end to function and will thus bring about a reversal of gear 64 turn and of pivot 28—28 travel. In this connection, the relation that the number of teeth on the disk 67 bears to the length of the periphery of the surface to be carved and also to the notches of the locking rack bar 32, should not be overlooked.

(6) The controlling device for intermittently maintaining the workpiece-holder in, and moving to, position automatically. (Figs. 3, 7, 18 and 19.)

The workpiece 84 from which the soundboard is to be fashioned is sawed to finish outline with the exception of a number of flanges 84ᵈ left temporarily projecting to facilitate attachment of the workpiece to the mounting frame 85. (See Figs. 3, 10 and 19.) Upon transverse machine frame member 20ᶠ rests another frame 33ᵃ which extends upwardly to the XZ-plane and gives rigid support to a stationary ring 34 on whose inner edge rollers 33ᶜ operate. These rollers are carried on the periphery of a rotatable workpiece supporting disk 33 and spaced at suitable intervals. Secured to the disk 33 is a lock and feed ring 35 by means of which the disk 33 may be rotated around the axis X (already defined) and also be locked into a new position. The outer edge of the ring 35 is provided with gear teeth 35ᵃ and the inner edge with notches 35ᵇ, having a predetermined spaced relation for purpose later described.

Only the left hand side of the machine—as viewed in Fig. 3—has this mechanism and for this reason the stub shaft 25 on the left hand side extends through and beyond the bracket 43 further than the stub shaft on the right hand side. This extended part is of smaller diameter and on the shoulder thus formed are cut ratchet teeths 25$^a$ see Fig. 7, acting as cam surfaces and co-operating with corresponding teeth of a gear element 56 having sleeve-like freedom on the extended portion of said stub shaft 25. Gear teeth 56$^e$—cut in the periphery of 56—mesh with corresponding gear teeth of a rack element 56$^a$, yieldably carried in an elongated slot on the rod 52, due to a spring 56$^b$.

As has already been described, the rods 52 will deposit the frame A on their return or down-movement during a workstroke and then continue this down-movement for which purpose slots 52$^a$ are provided, see Fig. 18. The rack element 56$^a$, moving downward with the rod 52, is held in engagement with the sliding gear 56 by a spring 56$^b$ and this movement will thus cause both a turn of gear 56— due to its gear teeth on the periphery and a sliding inwardly, due to the ratchet teeth on its side; this sleeve gear 56 is forced back to normal position after a required partial turn and end movement has been executed by the pressure of the conical spring 56$^c$.

The sleeve gear 56 has an angular groove 56$^d$ in which the flange 57$^a$ of a vertical strip 57 operates; said strip being arranged in an elongated aperture 52$^b$ in one side wall of the rod 52 and extends outwardly therethrough. A rack bar 58, see Fig. 7, arranged yieldably, due to a spring 58$^d$—on the side face of rod 52, has on its outer edge a groove 57$^b$ which receives slidably a corresponding flange of strip 57. The inner edge of the rack bar has teeth 58$^a$, adapted to engage intermittently a pinion 59; this engagement being initiated by the inward sliding of the sleeve gear 56. Pinion 59 turns freely upon stationary pin 59$^a$, supported by the two frame members 34 and 33$^a$, and meshes with the teeth 35$^a$ of ring 35. Key plates 57$^c$ key the rack bar 58 to the strip 57; said key plates being slidably accommodated in passage ways 57$^d$ inside the wall of rod 52. (See Fig. 18).

Due to the key connection of member 57 and rack bar 58, these two members move as a unit and the inward movement of sleeve gear 56, transmitted to the flange 57$^a$ through its connection with the groove 56$^d$, serves to engage the rack bar with the pinion 59. As this inward movement takes place only while the rack bar is moving downward, this engagement of the downward moving bar will necessarily cause a rotational movement of the pinion 59, with a consequent fractional turn of the feed ring 35.

The plate member 60 is constrained in its position on the outer face of the pinion 59 by two flanges 60$^d$, projecting into corresponding grooves cut into the back face of ring 34. This plate member 60 has, however, the freedom of a sliding movement horizontally, in conjunction with the rack bar 58, with which it has connection by means of an angularly shaped outer edge terminating in a flange 58$^e$, slidably joined with a corresponding chamber 58$^f$ on the rack bar. The inner edge of member 60 has an angular enlargement 60$^a$, which accommodates an adjustable rod 60$^c$, carrying a key block 60$^b$ adapted to engage any one of the notches 35$^b$ of the feed ring. A flat spring 58$^b$ normally serves to maintain the key block 60$^b$ in engagement with the respective notch on the feed ring and the rack bar 58 with the pinion 59.

(7) The pivot setting mechanism, which sets and controls the position of the pivots 28—28 upon which the lever frame L turns. (Figs. 3, 8, 9, 16 and 21).

The mechanism for both sides of the machine is alike and only one side will be considered. Each frame member 22 of the swinging frame L swings upon an adjustable pivot 28 which intermittently moves during the adjustment period perpendicularly against the YZ-plane or away therefrom, as the condition of the position of the workpiece—positioned for carving—may demand. As the curves generated in the manner of this invention on the independent surface are parabolas, the involved quantities $x$, $y$ and $p/2$ must have representation as functional elements in the machine which bear the relation $y^2 = 2px$ for any point of every such curve, see Fig. 21; for limiting points on the periphery of the independent surface the arc depth $x$ will be constant for all curves, but the ordinates $y'$, $y''$, $y'''$, ... $y^n$ will vary from point to point and the lever length L (which is represented by the parameter $p/2$) must also vary in accordance with the relation expressed by the equation $y^2/4x = p/2$ (or, since $x$ is constant, by $y^2/c = p/2$) for the ordinates of these peripheral points as they are brought into position by the intermittent, rotational advance of the workpiece. It will of course be understood that only means ordinate values of the successively positioned portions to be carved can be considered for pivot adjustment and that for sake of accuracy these portions shall not be taken too large—say not over three-eighth inch width.

The moving of the pivots 28—28 to a new position is accomplished by moving the carriage D, as has been described. The necessary adjustment to maintain the required relationship of all the parts is predetermined and involves the spacing of the locking notches 35$^b$ on the feed ring 35, the spacing of the notches 30$^b$ on a locking rack bar 32, the correlation of the angular displacement of gear 64 for each intermittent swing of the drive frame 70 with the space distance of notches 30$^b$ and the layout of cam tracks 67$^a$ ... h on the reverse mechanism. A hand adjustment of the pivot position is, however, provided for and will be later described.

Each of the two upwardly directing bearing brackets 28$^c$ of carriage D has mounted to its upper end a pivot pin 28; the projecting portion of this pin carries a bushing 30$^a$ which is journalled into a bearing block 30 arranged within the channel of the swinging frame member 22. Mounted in said bearing are lock devices consisting of a lock plate 31 with downwardly projecting teeth 31$^b$ and oppositely directed pins 31$^c$ secured to the plate. The lock plate is normally depressed by springs 31$^d$, housed in holes in the bearing block 30, in which holes also the pins 31$^c$ slidably operate.

The teeth 31$^b$ of the lock plate are adapted to engage a series of three teeth and recesses 30$^b$ of an adjustable locking rack bar 32. Arranged inside the channel of each swinging frame member 22 pivotally attached to each bearing bracket 28$^c$ is a lever 63$^b$ having a lip-like ending to fit a projecting tongue 31$^a$ of the lock plate 31. This lever 63$^b$ is in communication with the pivot release rod 62$^a$ by means of the link 63$^a$ and lever 63. (See Fig. 8). A depression of this release rod will thus be communicated through the three members 63, 63$^a$ and 63$^b$ to the lock plate 31, with the effect of raising this plate out of its engagement with the locking rack bar 32 and the consequent release of the pivot 28 from the lever frame member 22. The spring 63$^c$ simply acts in conjunction with the two springs 31$^d$ to force and keep the lock plate 31 in engagement with the locking rack bar 32.

Each of the two release rods 62$^a$ is coupled at its forward end to an L shaped lever 62; normally, these rods are held in a raised position by the pull of the springs 62$^c$, but they are depressed by the action of a rocker arm 61$^b$, pivotally supported by frame member 61$^c$, on each side of the machine. (Fig. 3.) Each rocker arm 61$^b$ receives the appropriate motion from one of the two striker cams 61 and 61$^d$ as they descend with the rod 52 by which they are carried; this motion is communicated through the rocker arm 61$^b$ to the L-shaped lever 62 and through this to the rod 62$^a$. The rearward end of this rod is coupled to lever 62$^b$ said lever being pivoted to a pin on frame 20$^c$. A stop 62$^e$ resists the action of the spring 62$^c$ and maintains the rod 62$^a$ in its proper normal position. The release of the pivots 28—28 from the lever L is thus brought about by the down movement of rods 52, which motion is communicated by means of various members of this mechanism to the lock plate 31 to raise this lock plate out of its engagement with the teeth of the locking rack bar 32.

The second striker cam 61$^d$ on each rod 52 is provided because the reverse mechanism creates a condition that cannot be met with only one such cam. It will be apparent that the release of the pivots, through plate 31, must closely precede any shifting thereof, for normally, the release cycle is directly followed by the shifting of the pivots to new position during which shifting the lock plate 31 is prepared to spring into clutch engagement with the teeth of bar 32; if after their release the shifting of the pivots is delayed the lock plate 31 will drop back into its old position. In the description of the reverse mechanism it has been shown that the turn of gear 64 takes place once upon the down swing of the left hand arm of the drive frame 70 and for the next series of drives upon the up swing. This then, is the condition above referred to, which causes the delay of pivot shift and makes a second striker cam necessary.

Each locking rack bar 32, constituting a part of the members 22, is adapted for a slight endwise adjustment by means of a threaded end portion 32$^a$ at the rearward terminal. (See Fig. 17.) A thumb nut 32$^b$ thereon has an annular groove 32$^c$, said groove engaging a segmental flange 32$^d$ of bracket 32$^e$ secured to the end member 22. Normally, the bar 32 is held in immovable position relative to member 22 by the binding screw 32$^f$, it being understood that the teeth of the two bars 32 are in transverse alinement on the machine.

For purpose of initial adjustment at the beginning of operations as well as to permit continuous control of the functioning of the automatic pivot setting device by inspection, the following hand setting mechanism is provided. (See Figs. 3, 16, 20 and 21.) The workpiece supporting disk 33 carries on its front face an outline cam 33$^b$ of substantially the outline of the peripheral boundaries of the two surfaces on the sound board to be carved; this cam turns with the disk 33 around axis X passing through O. A frame 78, with follower roller 78$^a$, constrained against lateral displacement by guide parts not shown rides on the outline cam 33$^b$. (The upright rod 78$^b$ is also for purpose of guidance.) This frame 78 has below two pointer blades 80, pivotally fastened to it and normally extending forwardly at right angle to the YZ-plane. A second frame 79 below has also two blades 81, but they are in this case held rigidly forward perpendicularly to the main plane of this frame. Each pointer blade 80 is paired and movably connected with a blade 81 by means of a pin 80$^a$ having free movement in a slot of pointer blade 80. The free terminals of blades 81 are notched for indicator purposes. Attached to the front face of gear 64 is a face cam 77 with groove 77ª, the center line of which is a parabolic spiral; in this groove operates the follower roller 79ª.

By this arrangement any turn or angular displacement of either the workpiece supporting table 33 or the gear 64 will be registered by a displacement of the pointers 80 from the reference notches 81$^b$. When these notches and pointers coincide then the axis P—P is set correctly for the positioned radial portion on the workpiece. It is of course understood that in laying out the parabolic spiral of the cam 77 the two constants $c$ and $x$ in the equation of this curve ($\rho^2=cx\phi$) note Fig. 21, shall have been properly determined to meet the required conditions. Of these two constants, $c$ is a coefficient of the velocity ratio for the transmission system moving the carriage D and $x$ is the already defined measure of the arc depth of the sound board; the radius vector $\rho$ of the spiral is equal to the ordinate $y$ for the limiting point $(x, y)$ on the generated curve of any positioned portion; in other words, for the points on the outline of the surface to be carved. The vectorial angle $\phi$ of the spiral is also the angle through which the gear 64 must be turned to bring the axis P—P into correct position to give a required lever length L for carving a positioned portion on the workpiece.

(8) *Unclassified mechanism*

The belt 26ª passes around a pulley 26$^b$ on the shaft 26$^c$ of an electric motor 26$^d$; an arm 26$^e$ on this shaft supports at its free end an idler pulley 26$^f$, which under the pull of the spring 26$^g$ bears upon the belt 26ª to maintain this belt in uniform tension. (Fig. 1).

The weight of the motor 26$^d$ on the negative end of frame L is counterbalanced by a weight 27, suspended by means of a cable 27ª from a drum 27$^b$, this drum being keyed to one end of drum shaft 27$^c$; the shaft 27$^c$ in turn is supported by hangers from the ceiling and has longitudinal keyways in which a pulley 27$^d$ slidably operates by means of rollers 27$^e$, to respond to the variation of the horizontal component of the negative part of frame L during the downward swing of this part. The object of this sliding is to maintain the motor supporting cable 27$^f$ in a vertical direction during the swing of frame L.

*The operation of the generating device*

In order to fully describe the operation of what is here termed "the generating device of the machine", the following is submitted. The primary function of this mechanism is: To so constrain the movement of axis Z' during a workstroke that every point on this axis will describe a limited path in planes parallel to the XY-plane, which path is one, and can be any one, of the curves of the conic sections. This device fulfils, however, another equally important function, namely, its interaction with the graduating device, specifically through the movements of bracket 21 and link 23, which movements maintain the cam blade 55 in invariable, spacial relation to the instantaneous point of the forming curve. The device operates furthermore in rocking the oscillating frame A so as to maintain the axial plane of this frame always directed normally to the aforementioned point of the forming curve. The general applicability of this device to all curves of the second degree follows from the definition that: Every curve of the second degree is the locus of a point which moves so that its distances from a fixed point (focus) and a fixed line (directrix) are in constant ratio. This ratio is known as the eccentricity of the curve and is denoted by $e$ in the following.

It is necessary, before going further, to point out that the case of the parabola (which is here carried out) permits a variant mode of connecting the links 45 and 45ª to joints 45$^b$ and 45$^c$, respectively. This mode of joint connection is here adopted and consists in joining these links directly to lever 22 and beam 21ª and not to the sliding arms 24ª and 23ª; such a mode of joint connection cannot generally be carried out, as these joints in general must slide with the sliding members 23 and 24.

At the beginning of a workstroke the axis Z' lies in the XZ-plane and the lever member 22 is alined with the beam 21ª, while axis Z' is in this position, let its distance from the fixed point (focus) be designated by L and its distance from the fixed line (directrix) by Q; then according to the above definition the ratio L/Q is constant for the whole range of angular displacement of lever 22. When now the stub shafts 25 are carried upward by the up-moving rods 52, the beam 21ª end will move in its allotted path which lies in the ZY-plane and the lever 22 end will have as its path a true arc around center P. As the axis Z' is joined to both members this condition requires a lengthening of one (as in the case of the circle) or of both members. The slidable joints 23 and 24 with 21ª and 22 permit this lengthening to take place. These added lengths to lever 22 and beam 21ª shall be designated by $w$ and $x$, respectively, note Fig. 21 and they must bear such relation to each other as to fulfill the condition that the ratio $L+w/Q+x$ shall remain constant for all positions of axis Z'. It can be proven that the arrangement as described and shown by drawings fulfills these conditions for generating the parabola. (Note: the fixed line or directrix has here merely a fictitious existence; it is necessary, however, in laying out the distances from the axis Z' to the two joint axes 45$^b$ and 45$^c$, to strictly observe the proportion of the lengths L and Q and this in reverse order, that is, if $$(L<Q \text{ then } (Z', 45b>Z', 45c).)$$

Which of the possible forms the generated curve will assume will depend upon this eccentricity $e$ and as this can be predetermined by apportioning the distances of the two joint axes 45$^b$ and 45$^c$ from the axis Z' and making the links 45 and 45$^a$ of proportioned lengths, it will be seen that the curve described by the axis Z' during a workstroke can be an ellipse, when $(e<1)$, or a parabola, when $(e=1)$, or a hyperbola, when $(e>1)$; as to the circle, this is merely a limiting case of the ellipse, in which the quantity $w$ remains equal to zero throughout the workstroke and accordingly, the link 45$^a$ can be dispensed with. For a sound board of circular peripheral outline, the above-named simple changes suffice to directly adapt the machine to carve a surface with any of these curves as its elemental components in the manner of this invention.

For a workpiece of non-circular outline however, the adaptation of this machine for generating such quadric surfaces as an ellipsoid or an hyperboloid requires some additional changes, because then the value of $(e)$ is specific for a given ellipse or hyperbola as surface element and accordingly the length of one of the two links 45, 45$^a$, would have to be changed together with the respective joint distance from the axis Z' in conjunction with the change in the length of lever (L). But the principles inherent in the given structure of this invention admit of a simpler and more direct method for generating these curves and one which makes use basically of the same link arrangement and pivot control device has here been shown and described for the case of the parabola. By this method the ellipse and the hyperbola are regarded as resultant curves, each derived from two curves—an auxiliary parabola and a second curve superimposed upon the parabola, the two curves having common ordinates but different abscissas. Let $(x)$ denote the abscissas for a moving point on the ellipse and $(x_1)$ the abscissas on a parabola; then the point $(x_1\ y)$ on the parabola will always move in an ellipse relatively to a stationary space if the entire system of this moving point moves in direction of the curve-axis by an amount $(x-x_1)$ at a required rate of acceleration. The following formulation will make this clear, attaching the same meaning to symbols as before:

Writing the expression of the parabola in Cartesian coordinates $(y^2=2px)$ in the identical form $$(x+x)p+(x^2-x^2)=y^2$$

and changing this then to the vector form $$(w+x)p+(w^2-x^2)=y^2$$

we have in this a general equation for all curves of the conics; by giving $(p)$ and $(w)$ their respective values in (L) and $(x)$, namely, $p=2L$, and $w=ex$, the above equation can be referred back to rectangular coordinates. The resulting equation:

$$2(l+e)\ Lx-x^2(l-e^2)=y^2,$$

contains now also the initial lever-length (L) which as a function of $(e)$ remains constant during the workstroke but varies when $(e)$ varies. If in this equation only the first of the left-hand terms is equated to the right-hand term, the equation is that of a parabola; if $(e=l)$ the second left-hand term vanishes; otherwise this term denotes the relation of the moving space to the moving point on the auxiliary parabola. The sign of this member changes when $(e)$ passes through the value (1).

It can be shown by means of the differential equation of motion, that if a point which moves along the auxiliary parabola and with a moving space in direction of the curve-axis by an amount $(x-x_1)$ is to describe, relatively to a stationary space, the resultant path of an ellipse or an hyperbola, then the acceleration of motion of the point along the curve-axis will be subject to two laws:—the law of a parabola and the law of an ellipse or an hyperbola (as the case may be), and from this it can be deduced that the complete cam for controlling the motion of a tracer-point on axis Z' along the path of a desired ellipse or hyperbola must have the form of an elliptic paraboloid or an hyperbolic paraboloid.

It is now apparent that by this method the generating device for the three species of conics is fundamentally alike in that it requires in every case the same link arrangement and the same pivot-control-device. The cases of the ellipse and of the hyperbola have in addition to this fundamental equipment for the parabola a moving pivot 28—28 during the workstroke, which carries the lever system along the curve-axis by a predetermined amount and at a predetermined rate of acceleration.

The connection of the generating device with the frame A by means of stub shafts 25, joints 44$^b$ and levers 44 is obvious and needs no further description.

*The operation of the graduating device*

The primary function of this device is to regulate the thickness separating opposite points along the respective radial sections at the instant of carving the same. This adjusting of thicknesses is known as "graduating." The essential features of this device are as follows:

The cam blades 55 are independent of the oscillating frame A and do therefore not partake in the angular movement of this frame around axis Z', upon which this frame turns. Each cam blade 55 maintains itself during all positions of the workstroke in the horizontal plane of the ordinate of the point generated at a given instant on the independent surface and at a constant distance from the axis Z' when measured in the direction of this horizontal plane. The cam blade 55 maintains this position by virtue of its motion with beam 21$^a$ and sliding link 23.

With the frame A turns every part carried by it, particularly, in this connection, the two spindles 54 on the side of the workpiece which is to be convexed. As the oscillations of frame A keep its main plane always directed normal to the point on the generated curve through which the instantaneous axis Z' passes, the spindles 54—lying in this plane—will be similarly directed. The follower points 55$^c$, at the end of these spindles, will during these oscillations glide over part of the peripheral edge of the graduating cams 55 and if this edge has a contour which is eccentric with the axis Z', the oscillations of the frame A will cause a reciprocating end movement of the spindles 54 and in this movement they will carry the respective carving device C with them.

There are three distinct cases arising from the shape of the contour of this peripheral edge of cam 55, namely: Case (a) the peripheral edge is concentric with axis Z'. In this case, the radius vector describing the cam periphery is of constant length with respect to its polar point on axis Z', whence no sliding of the cutter device C is caused by this source. Therefore with case (a) prevailing, the resulting thickness of the sound board will be uniform.

With case (b), the peripheral edge of the graduating cam 55 is eccentric with respect to axis Z' and the radius vector describing this peripheral edge is of a continuously increasing magnitude and increasing with the vectorial angle, which angle is represented by the angular displacement of the frame A from its initial position at the beginning of the workstroke. In this case, the cutter device C will be forced to slide way from the workpiece during the workstroke upward. With case (b) prevailing, the radial sections of the finished sound board will increase in thickness from the center outward.

With case (c), the peripheral edge of the cam 55 is eccentric with respect to axis Z' and the radius vector describing this cam edge decreases in magnitude as its aforementioned functional angle increases. In this case, the cutter device C will be forced to slide against the workpiece during the lever L stroke outward and the resulting thickness of the finished sound board will be such that each radial section has a thickness decreasing from the center outward.

Any contour of the graduating cam deviating from these three normal cases will be merely a variation or combination of these main cases and need not be explicitly treated here.

For cases (b), and (c), i. e. for cases with eccentric graduating cam, it can easily be shown by mathematical formulation, that there is, in addition to the variation of thickness throughout any radial section of the finished sound board, also an intersectional variation of thickness, or a variation of thickness which is specific to any given radial section. It can furthermore be shown that in both cases (b) and (c), this intersectional variation is such that the specific thickness of any section with respect to another varies inversely as its radial length. In other words, the shorter these radial sections are, the thicker or thinner will they be around the periphery of the sound board, dependent upon whether case (b) or (c) prevails.

This makes case (c) especially important in this connection, as the means thus furnished are likely to anticipate the requirements of an exact law for the graduation of these sound boards with regard to facilities for carrying it out effectively. Such a law has not yet been formulated; but it may be expected nevertheless, that long sections of a centrally loaded plate should be left stronger and should therefore decrease less in thickness than short sections. This result can easily be brought about by the use of a graduating cam coming under the case (c).

The operation of the machine

The wood for the violin and kindred instruments is usually sawed or split in wedge-shaped pieces from logs of the required length and two of the adjacent wedges are glued together to form the stock for a sound board. After surfacing the straight face of this stock it is sawed to outline, but account has to be taken at this stage of the requirements of the machine process and instead of finishing this outline, there will be left a number of flanges 84$^d$ to facilitate the attachment of the workpiece to the mounting frame 85. This may best be done by gluing the stock 84 to the mounting frame and interposing paper between the glued surface so that these parts can be pried apart again when the purpose has been accomplished; but the flanges may also be bolted to the mounting frame.

Delay may be avoided by having a number of such mounting frames 85 on hand with stock attached to them. A mounting frame is next bolted to the workpiece supporting table 33. Care has to be exercised to position the point O identically with the axis of the workpiece supporting table 33, which is say with the axis X.

At this stage the operator will make the necessary adjustments on the machine; he will give the disk 33 a turn until the pointers 80 indicate that a radial portion of the workpiece is in correct position for a given pivoted lever length; otherwise, it is immaterial with what portion the carving process is begun. The thickness at the center of the sound board, he will determine by turning the set screw 55$^d$ and the graduation he may vary by means of the adjustment screw 55$^e$ or else by changing the cam blade 55. The depth of the arc at the point O will not as a rule be varied but should this be the case then the face cam plate 77 must be exchanged for one designed for the particular arc depth, as will be clear from the equation of the spiral of this cam.

The motor can then be started and the operation of carving begun by giving the hand wheel a turn in the required direction, which will have the effect of lifting the rods 52 upwardly together with the frame A and performing a workstroke. By a workstroke shall be understood an upward swing of the lever L from its initial position in the XZ-plane until this stroke is terminated by the stops 24$^d$ and also the necessary return swing to its starting position during which interval the workpiece supporting table remains in a clutched position for the carving of the positioned portion of the workpiece. The lever L never swings below the XZ-plane.

Upon depositing the frame A in its starting position the downward movement of the rods 52 will be continued for some distance in order to supply the motive power for the various automatic movements. A new portion of the workpiece is automatically brought into position; the requried lever length L for the new portion too is automatically adjusted during this interval. The operator has therefore only to turn the hand wheel in alternate direction whereon all the movements contributing to the generating, graduating and carving of a positioned portion of the workpiece (in addition to the continuous, rotational movements of the cutters) will take place during the movement of the stub shafts 25 of frame A by the moving rods 52; and all the necessary adjustments, such as: moving the pivots 28—28 to new position, positioning and clutching a new portion on the workpiece for carving, reversing the direction of pivot travel, and the releasing of the lever L from the pivots 28—28 and locking this lever to these pivots, will take place during the additional movement of these rods 52 after depositing the frame A in its position of rest in the XZ-plane.

By a series of radial cuts, such as are shown in $a$, $b$ and $c$ on Fig. 14, the entire workpiece will be carved from both sides at the same time and if the peripheral width of the portions has not been taken too large (it will be about $\frac{5}{16}$ of an inch) the whole surface will be smoothly carved. But any ridges may be smoothed down by going over the surface a second time; before this is done, the operator will shift the locking rack bars 32 by half a tooth distance; he does this by turning the adjustment nuts 32$^b$ by a required amount, and he will also adjust the key block 60$^b$, Fig. 7, correspondingly. These adjustments will bring the ridges in central position on the positioned portion for the cutting stroke. In this way the entire surface will have been smoothly carved and can be pried loose from the mounting frame and the flanges trimmed off. The sound board thus carved will also be precisely graduated for every point of the surface, an accomplishment impossible by hand work.

It will be noted from Fig. 14 that the contour line 84$^a$ of the carved surface deviates inwardly at certain places from a parallel to the outline of the sound board; these uncarved spaces are intended to facilitate the attachment of six blocks which are, together with the sides of a violin, the connecting parts between the top and bottom sound board of a violin body.

It will be understood from the preceding description that a number of parts of this machine can be exchanged to meet requirements caused by different material, design, etc. Such interchangeable parts are: the locking rack bars 32, the face cam plate 77, the outline or contour cam 33$^b$, the reversing disk 67, the graduating cam blades 55 and the feed ring 35. Notches on the feed ring are so spaced as to require a greater angular displacement or advancement of the workpiece supporting table for short radial cuts than for long ones. To resist the axial thrust on the shafts 42 which arises in the power transmission due to rectangular gearing, the rods 52 are to be appropriately constrained by means of guide boxes above and below. Either one of the two surfaces to be shaped on a workpiece may of course be chosen as independent surface.

For the manufacture of the different types of bow-instruments machines of at least two sizes might be used to advantage, while for the requirements of mass production machines with multiple effect could be built to accommodate a number of workpieces at a time.

It is apparent that my invention is not limited to the shaping of any particular kind of workpiece nor to the shaping of workpieces of any particular cross-sectional contour or outline. Also, because of their wide generality, the principles of this invention may be applied to objectives widely different from the one coordinating their specific embodiment as here described and accordingly the details thereof may have to be varied, all this within the scope of the appended claims and without departing from the spirit of the invention.

Having fully described my invention, what I claim as new and desire to secure by Letters Patent, is:

1. In a carving machine of the class described, a swinging cutter tool actuating frame having a pivot adjustable toward and from the cutter tool of the frame to vary the length and arc of travel of the cutter tool with reference to predetermined curvature and outline of a workpiece adjustably supported in the path of said cutter tool, and means involving an adjustable rack bar for fixing the pivot of the swinging frame in predetermined positions of adjustment.

2. A machine of the class described comprising a main frame, a feed screw rotatably mounted in said frame, a pivot frame operatably engaging said feed screw whereby the rotation of said screw will move said pivot frame longitudinally of the machine, a swinging frame supported in connection with and rotating upon the axis of the pivot frame, means for locking the pivot frame at predetermined points longitudinally of the swinging frame, a guided and movable cantilever beam movably coupled with one end of the swinging frame, means for guiding the beam frame through a predetermined path, and said swinging frame and beam frame being joined by a link system to continuously vary the length of said frames during the working stroke thereof in predetermined ratios.

3. A machine of the class described comprising a main frame, a feed screw rotatably mounted in said frame, a pivot frame operatably engaging said feed screw whereby the rotation of said screw will move said pivot frame longitudinally of the machine, a swinging frame supported in connection with and rotating upon the axis of the pivot frame, means for locking the pivot frame at predetermined points longitudinally of the swinging frame, a guided and movable cantilever beam movably coupled with one end of the swinging frame, means for guiding the beam frame through a predetermined path, said swinging frame and beam frame being joined by a link system to continuously vary the length of said frames during the working stroke thereof in predetermined ratios, and an oscillating frame transverse to one end of the machine and mounted on the pivotal coupling of said links and movable with the swinging and beam frames, and cutter devices supported by and movable with and independently of said oscillating frame.

4. A machine of the class described comprising a main frame, a feed screw rotatably mounted in said frame, a pivot frame operatably engaging said feed screw whereby the rotation of said screw will move said pivot frame longitudinally of the machine, a swinging frame supported in connection with and rotating upon the axis of the pivot frame, means for locking the pivot frame at predetermined points longitudinally of the swinging frame, a guided and movable cantilever beam movably coupled with one end of the swinging frame, means for guiding the beam frame through a predetermined path, said swinging frame and beam frame being joined by a link system to continuously vary the length of said frames during the working stroke thereof in predetermined ratios, and an oscillating frame transverse to one end of the machine and mounted on the pivotal coupling of said links and movable with the swinging and beam frames, cutter devices supported by and movable with and independently of said oscillating frame, a workpiece supporting member for rotatably supporting and intermittently fixing a workpiece in the path of movement imparted to said cutter devices, and means supported on one of the sliding coupling links and cooperating with said oscillating frame and one of the cutter devices supported therein for guiding the movement of said cutter device relatively to a workpiece supported in said member.

5. A machine of the class described comprising a main frame, a feed screw rotatably mounted in said frame, a pivot frame operatably engaging said feed screw whereby the rotation of said screw will move said pivot frame longitudinally of the machine, a swinging frame supported in connection with and rotating upon the axis of the pivot frame, means for locking the pivot frame at predetermined points longitudinally of the swinging frame, a guided and movable cantilever beam movably coupled with one end of the swinging frame, means for guiding the beam frame through a predetermined path, said swinging frame and beam frame being joined by a link system to continuously vary the length of said frames during the working stroke thereof in predetermined ratios, and an oscillating frame transverse to one end of the machine and mounted on the pivotal coupling of said links and movable with the swinging and beam frames, cutter devices supported by and movable with and independently of said oscillating frame, a workpiece supporting member for rotatably supporting and intermittently fixing a workpiece in the path of movement imparted to said cutter devices, means supported on one of the sliding coupling links and cooperating with said oscillating frame and one of the cutter devices supported therein for guiding the movement of said cutter device relatively to a workpiece supported in said member, and means involving a feed and lock ring on said member for intermittently keying and rotating said member to bring different sections or areas of a workpiece in the path of movement of said cutter devices.

6. A machine of the class described comprising a main frame, a feed screw rotatably mounted in said frame, a pivot frame operatably engaging said feed screw whereby the rotation of said screw will move said pivot frame longitudinally of the machine, a swinging frame supported in connection with and rotating upon the axis of the pivot frame, means for locking the pivot frame at predetermined points longitudinally of the swinging frame, a guided and movable cantilever beam movably coupled with one end of the swinging frame, means for guiding the beam frame through a predetermined path, said swinging frame and beam frame being joined by a link system to continuously vary the length of said frames during the working stroke thereof in predetermined ratios, and an oscillating frame transverse to one end of the machine and mounted on the pivotal coupling of said links and movable with the swinging and beam frames, cutter devices supported by and movable with and independently of said oscillating frame, a workpiece supporting member for rotatably supporting and intermittently fixing a workpiece in the path of movement imparted to said cutter devices, means supported on one of the sliding coupling links and cooperating with said oscillating frame and one of the cutter devices supported therein for guiding the movement of said cutter device relatively to a workpiece supported in said member, means involving a feed and lock ring on said member for intermittently keying and rotating said member to bring different sections or areas of a workpiece in the path of movement of said cutter devices, and a reversing mechanism involving a ratchet wheel intermittently rotated in one direction and a gear operably engaging said feed screw intermittently rotatable in forward and reverse directions for controlling and regulating the forward and reverse movements of the pivot frame.

7. A machine of the class described comprising a main frame, a feed screw rotatably mounted in said frame, a pivot frame operatably engaging said feed screw whereby the rotation of said screw will move said pivot frame longitudinally of the machine, a swinging frame supported in connection with and rotating upon the axis of the pivot frame, means for locking the pivot frame at predetermined points longitudinally of the swinging frame, a guided and movable cantilever beam movably coupled with one end of the swinging frame, means for guiding the beam frame through a predetermined path, said swinging frame and beam frame being joined by a link system to continuously vary the length of said frames during the working stroke thereof in predetermined ratios, and an oscillating frame transverse to one end of the machine and mounted on the pivotal coupling of said links and movable with the swinging and beam frames, cutter devices supported by and movable with and independently of said oscillating frame, a workpiece supporting member for rotatably supporting and intermittently fixing a workpiece in the path of movement imparted to said cutter devices, means supported on one of the sliding coupling links and cooperating with said oscillating frame and one of the cutter devices supported therein for guiding the movement of said cutter device relatively to a workpiece supported in said member, means involving a feed and lock ring on said member for intermittently keying and rotating said member to bring different sections or areas of a workpiece in the path of movement of said cutter devices, a reversing mechanism involving a ratchet wheel intermittently rotated in one direction and a gear operably engaging said feed screw intermittently rotatable in forward and reverse directions for controlling and regulating the forward and reverse movements of the pivot frame, said cutter devices involving rotary cutter blades, means involving an electric motor supported on the swinging frame and a pulley and gear mounted on one of the stub shafts of the oscillating frame in operative connection with said electric motor and said rotary cutter tools for actuating said tools, a contour frame on the workpiece supporting member of substantially the outline of the workpiece to be formed, and means involving a follower frame cooperating with said outline frame and a second follower frame suitably joined to the first follower frame, said second follower frame cooperating with a cam on said forward and reversely rotatable gear for designating the proper relative positions of the several operative elements of the machine to insure accurate carving of a workpiece.

8. A machine of the class described comprising a main frame, a swinging frame pivotally supported in connection with the main frame, means for movably supporting cutter devices in connection with one end of the swinging frame and on opposite sides of a workpiece and in opposed relation, and means coacting with said end of the swinging frame for independently and collectively guiding the movement of the cutter devices relatively to the opposite surfaces of a workpiece supported in the path of movement of said cutter devices during a working stroke of the machine.

9. A machine of the class described comprising a main frame, a swinging frame pivotally supported in connection with the main frame, means for movably supporting cutter devices in connection with one end of the swinging frame and on opposite sides of a workpiece and in opposed relation, means coacting with said end of the swinging frame for independently and collectively guiding the movement of the cutter devices relatively to the opposite surfaces of a work-piece supported in the path of movement of said cutter devices during a working stroke of the machine, and said last named means in conjunction with said swinging frame being adapted to guide the tools of said cutter devices in independent curved paths through the workpiece.

10. A machine of the class described comprising a main frame, a swinging frame pivotally supported in connection with the main frame, means for movably supporting cutter devices in connection with one end of the swinging frame and on opposite sides of a workpiece and in opposed relation, means coacting with said end of the swinging frame for independently and collectively guiding the movement of the cutter devices relatively to the opposite surfaces of a workpiece supported in the path of movement of said cutter devices during a working stroke of the machine, said last named means in conjunction with said swinging frame being adapted to guide the tools of said cutter devices in independent curved paths through the workpiece, means for actuating said swinging frame and last named means, means for supporting and automatically moving the workpiece after each complete stroke of the cutter devices to bring a new and uncarved area of the workpiece in position to be carved, and means for shifting the pivot of the swinging frame to change the lever length of this frame.

11. A machine of the class described comprising a main frame, a swinging frame pivotally supported in connection with the main frame, means for movably supporting cutter devices in connection with one end of the swinging frame and on opposite sides of a workpiece and in opposed relation, means coacting with said end of the swinging frame for independently and collectively guiding the movement of the cutter devices relatively to the opposite surfaces of a workpiece supported in the path of movement of said cutter devices during a working stroke of the machine, said last named means in conjunction with said swinging frame being adapted to guide the tools of said cutter devices in independent curved paths through the workpiece, means for actuating said swinging frame and last named means, means for supporting and automatically moving the workpiece after each complete stroke of the cutter devices to bring a new and uncarved area of the workpiece in position to be carved, means for shifting the pivot of the swinging frame to change the lever length of this frame, and means whereby the cutter devices may be moved relatively to each other.

12. A machine of the class described comprising a main frame, a swinging frame pivotally supported in connection with the main frame, means for movably supporting cutter devices in connection with one end of the swinging frame and on opposite sides of a workpiece and in opposed relation, means coacting with said end of the swinging frame for independently and collectively guiding the movement of the cutter devices relatively to the opposite surfaces of a workpiece supported in the path of movement of said cutter devices during a working stroke of the machine, said last named means in conjunction with said swinging frame being adapted to guide the tools of said cutter devices in independent curved paths through the workpiece, means for actuating said swinging frame and last named means, means for supporting and automatically moving the workpiece after each complete stroke of the cutter devices to bring a new and uncarved area of the workpiece in position to be carved, means for shifting the pivot of the swinging frame to change the lever length of this frame, means whereby the cutter devices may be moved relatively to each other, and means involving a single operable unit for actuating the workpiece adjusting and pivot adjusting means of the machine in synchronism.

13. A machine of the class described comprising a main frame, a swinging frame pivotally supported in connection with the main frame, means for movably supporting cutter devices in connection with one end of the swinging frame and on opposite sides of a workpiece and in opposed relation, means coacting with said end of the swinging frame for independently and collectively guiding the movement of the cutter devices relatively to the opposite surfaces of a workpiece supported in the path of movement of said cutter devices during a working stroke of the machine, said last named means in conjunction with said swinging frame being adapted to guide the tools of said cutter devices in independent curved paths through the workpiece, means for actuating said swinging frame and last named means, means for supporting and automatically moving the workpiece after each complete stroke of the cutter devices to bring a new and uncarved area of the workpiece in position to be carved, means for shifting the pivot of the swinging frame to change the lever length of this frame, means whereby the cutter devices may be moved relatively to each other, means involving a single operable unit for actuating the workpiece adjusting and pivot adjusting means of the machine in synchronism, and means carried by and movable with the swinging frame for actuating said cutter devices.

14. In a machine of the class described, the combination with a workpiece supporting member of a pair of forming tools disposed at opposite sides of a workpiece supported in said member in opposed relation and adapted to shape the opposite faces of the workpiece, means for independently and collectively moving said tools over the faces of the workpiece, said last named means including means for guiding the tools through predetermined and independent curvilinear paths in the operation of shaping the same, means producing a definite movement of said tools relatively to each other and the workpiece in a working stroke of the machine, means for positioning different areas of the workpiece intermittently in the path of said tools and for retaining the workpiece supporting means against movement during the working stroke of said tools, and means for varying the length of travel of the tools radially of the work, and for gaging radial dimensions of the work comparably with such travel control.

15. A machine of the class described comprising a main frame, a swinging frame pivotally supported in connection with the main frame, spaced forming tools movably supported in connection with one end of the swinging frame, means in the main frame for supporting a workpiece in the path of and intermediate said tools, and means adjustable longitudinally of the main frame forming a variable pivot for the swinging frame to vary the path of movement of the tools with reference to each other on opposite faces of the workpiece.

16. A machine of the class described comprising a main frame, a swinging frame pivotally supported in connection with the main frame, spaced forming tools movably supported in connection with one end of the swinging frame, means in the main frame for supporting a workpiece in the path of and intermediate said tools, means adjustable longitudinally of the main frame forming a variable pivot for the swinging frame to vary the path of movement of the tools with reference to each other on opposite faces of the workpiece, and means movably engaging the main frame and slidably coupled with the swinging frame for controlling and regulating the curvilinear movement of the tools with relation to each other and the workpiece.

17. A machine of the class described comprising a main frame, a swinging frame pivotally supported in connection with the main frame, spaced forming tools movably supported in connection with one end of the swinging frame, means in the main frame for supporting a workpiece in the path of and intermediate said tools, means adjustable longitudinally of the main frame forming a variable pivot for the swinging frame to vary the path of movement of the tools with reference to each other on opposite faces of the workpiece, means movably engaging the main frame and slidably coupled with the swinging frame for controlling and regulating the curvilinear movement of the tools with relation to each other and the workpiece, means for actuating the swinging frame and last named means to move the tools relatively to each other and the workpiece, and said last named means including means for shifting said pivot means and for intermittently moving different areas of the workpiece in position to be carved by said tools.

18. In a forming machine of the class described, employing a relatively fixed and rotary adjustable workpiece supporting member and forming devices arranged in opposed relation and on opposite faces of a workpiece supported in said member, means for intermittently moving said devices and work-supporting member, one relative to the other so that said devices are adapted to move over predetermined and successively adjacent sections of the workpiece to fashion the entire area of both faces thereof to a predetermined cross sectional form and contour, said means involving a swinging frame controlling the forming devices for both faces of the work, a pivotal support for said frame, and means for adjusting said support longitudinally of said frame and toward and from said forming devices to increase and decrease the length of the frame in changing the arc traversed by said devices.

19. In a forming machine of the class described, employing a relatively fixed and rotary adjustable workpiece supporting member and forming devices arranged in opposed relation and on opposite faces of a workpiece supported in said member, means for intermittently moving said devices and work-supporting member, one relative to the other so that said devices are adapted to move over predetermined and successively adjacent sections of the workpiece to fashion the entire area of both faces thereof to a predetermined cross sectional form and contour, said means involving a swinging frame controlling the forming devices for both faces of the work, a pivotal support for said frame, means for adjusting said support longitudinally of said frame and toward and from said forming devices to increase and decrease the length of the frame in changing the arc traversed by said devices, and means coupled with said swinging frame for varying its length during a working stroke.

20. In a forming machine of the class described, employing a relatively fixed and rotary adjustable workpiece supporting member and forming devices arranged in opposed relation and on opposite faces of a workpiece supported in said member, means for intermittently moving said devices and work-supporting member, one relative to the other so that said devices are adapted to move over predetermined and successively adjacent sections of the workpiece to fashion the entire area of both faces thereof to a predetermined cross sectional form and contour, said means involving a swinging frame controlling the forming devices for both faces of the work, a pivotal support for said frame, means for adjusting said support longitudinally of said frame and toward and from said forming devices to increase and decrease the length of the frame in changing the arc traversed by said devices, and means movable with said frame for controlling and regulating the movement of said devices relatively to each other and said workpiece.

21. A machine of the class described comprising a workpiece supporting member, means for rotatably supporting said member, forming tools arranged to engage and fashion opposite faces of a workpiece supported in said member, means for moving said tools radially with respect to the axis of said member and in curvilinear paths in the working stroke of the machine, means for intermittently rotating said member through predetermined and varying fractions of the complete revolution to bring successive areas of the workpiece in position to be engaged and formed by said tools, means for intermittently keying said member against rotation during the operation of the tools over the workpiece and means for varying the length of travel of the tools radially of the work and for gaging radial dimensions of the work comparably with such travel.

22. A machine of the class described comprising a workpiece supporting member, means for rotatably supporting said member, forming tools arranged to engage and fashion opposite faces of a workpiece supported in said member, means for moving said tools radially with respect to the axis of said member and in curvilinear paths in the working stroke of the machine, means for intermittently rotating said member through predetermined and varying fractions of the complete revolution to bring successive areas of the workpiece in position to be engaged and formed by said tools, means for intermittently keying said member against rotation during the operation of the tools over the workpiece, means for varying the length of travel of the tools radially of the work and for gaging radial dimensions of the work comparably with such travel and means for governing the intermittent fractional rotation of the workpiece supporting member.

23. In a machine of the class described, a swinging frame, a movable pivot for said frame, a workpiece supporting member arranged at one end of said frame, forming devices in operative engagement with said end of the frame and disposed in spaced relation and at opposite sides of a workpiece supported in said member, means for intermittently and automatically moving said pivot toward and from said end of the frame to control the arc travel of said devices, and means for keying said pivot means in its several positions of adjustment with relation to the swinging frame and during the working strokes of said devices.

24. In a machine of the class described, a swinging frame, a movable pivot for said frame, a workpiece supporting member arranged at one end of said frame, forming devices in operative engagement with said end of the frame and disposed in spaced relation and at opposite sides of a workpiece supported in said member, means for intermittently and automatically moving said pivot toward and from said end of the frame to control the arc travel of said devices, means for keying said pivot means in its several positions of adjustment with relation to the swinging frame and during the working strokes of said devices, and means for rotating the tools during the working stroke.

25. In a machine of the class described, the combination with a workpiece supporting member of two tools disposed at opposite sides of a workpiece supported in said member and adapted to operate upon opposed areas of the workpiece, means for moving and guiding said tools in predetermined paths through the workpiece, and means for rotating the workpiece intermittently so that it is traversed by said tools over the entire area thereof, said tools being mounted on a common swinging frame and passing through the workpiece in curved paths in predetermined relation forming concavo convex surfaces, and means for varying the relative spacing of the tools in passing over predetermined points or sections of the workpiece to produce varying and contrasting thicknesses throughout predetermined areas thereof.

26. In a machine of the class described, the combination with a workpiece supporting member, of two tools disposed at opposite sides of a workpiece supported in said member and adapted to operate upon opposed areas of the workpiece, means for moving and guiding said tools in predetermined paths through the workpieces and means for rotating the workpiece intermittently so that it is traversed by said tools over the entire area thereof, said tools being mounted on a common swinging frame and passing through the workpiece in curved paths in predetermined relation forming concavo-convex surfaces, means for varying the relative spacing of the tools in passing over predetermined points or sections of the workpiece to produce varying and contrasting thicknesses throughout predetermined areas thereof, and means movable with said tools for rotating the same in the operation of the machine.

27. In a machine of the class described, the combination with a workpiece supporting member of two tools disposed at opposite sides of a workpiece supported in said member and adapted to operate upon opposed areas of the workpiece, means for moving and guiding said tools in predetermined paths through the workpiece, and means for rotating the workpiece intermittently so that it is traversed by said tools over the entire area thereof, said tools being mounted on a common swinging frame and passing through the workpiece in curved paths in predetermined relation forming concavo-convex surfaces, means for varying the relative spacing of the tools in passing over predetermined points or sections of the workpiece to produce varying and contrasting thicknesses throughout predetermined areas thereof, said tools being supported in an oscillating frame and said oscillating frame being supported in connection with the swinging frame and a guide frame, said swinging and guide frames being movably coupled together.

28. In a carving machine of the class described, a swinging tool actuating frame, a pair of spaced and relatively movable tools arranged at one end of said frame and adapted to be disposed at opposite sides of a workpiece supported in the machine, said frame having a pivot adjustable toward and from said tools to vary the length and arc of travel of the tools with reference to predetermined curvature and outline of said workpiece, and means for adjustably supporting said workpiece in the path of said tools transversely with respect to the movement of the tools thereover.

29. In a machine of the class described, a swinging tool actuating member, a pair of relatively spaced and opposed tools in operative engagement with the free end of said member and arranged on opposite faces of a workpiece supported in the machine, means cooperating with said member for varying the length thereof with respect to its axis during each complete swinging stroke of said member to control and regulate the path of the tools with respect to each other and the opposite faces of the workpiece.

30. In a machine of the class described, a swinging tool actuating member, a pair of relatively spaced and opposed tools in operative engagement with the free end of said member and arranged on opposite faces of a workpiece supported in the machine, means cooperating with said member for varying the length thereof with respect to its axis during each complete swinging stroke of said member to control and regulate the path of the tools with respect to each other and the opposite faces of the workpiece, said means involving a sliding frame and means disposed between and movably coupled with adjacent ends of said member and frame and in operative engagement with said tools.

31. In a machine of the class described, a pivot lever frame and a frame sliding tangentially to the arc of swing of the pivot frame, pivot means providing an axis, disposed between and coupled with adjacent ends of the respective frames movably, for varying the lengths of said frames, said last named means involving a link system controlling the proportionate lengthening of the respective swinging and sliding frames in combination with trace defining mechanism, an element of whose course is set by that of said axis.

32. In a machine of the class described involving a workpiece supporting member, means on said member representing the outline of a predetermined workpiece mounted thereon, forming tools disposed at opposite faces of the workpiece, means for moving said tools relatively to the opposed faces of said workpiece in predetermined paths, means for intermittently moving the workpiece to bring successive sections thereof into position to be engaged and fashioned by said tools, and means involving a member cooperating with said first named means for coordinating the relative operation of said workpiece actuating means and said tool actuating means.

33. In a machine of the class described, a workpiece supporting member, a workpiece forming mechanism, means involving an oscillating frame for movably supporting said mechanism with reference to said member, means for actuating said first named means and to move the axis of said oscillating frame relatively to said workpiece supporting member and means cooperating with said frame and mechanism for controlling the course of said mechanism relatively to a workpiece supported in said member, said mechanism involving a pair of tools on opposite sides of the axis of oscillation and arranged to engage and fashion opposite faces of the workpiece supported in said member.

34. In a machine of the class described, the combination with a workpiece supporting member of a pair of forming tools disposed at opposite sides of a workpiece supported in said member in opposed relation and adapted independently to shape the opposite faces of the workpiece, means for independently and collectively moving said tools over the workpiece in predetermined and independent paths in the operation of fashioning the same, said means involving a sliding beam frame, a swinging frame and means disposed between said frames and movable relatively thereto and involving a pivoted axis passing through the workpiece in a curvilinear path in the operation of carving the same.

35. In a machine of the class described, a workpiece supporting member, a trace defining mechanism involving a pivoted axis guided in a definite path with respect to said member, means involving an oscillating frame supported on and movable with said pivoted axis, shaping devices on said frame and comprising two units primarily guided in paths of and parallel to the centrode of the moving pivoted axis in common movement, and independently movable in directions perpendicular with respect to said centrode, and means cooperating with said oscillating frame and said trace defining mechanism for controlling the distance of one of said shaping devices from said pivoted axis.

36. In a machine of the class described, the combination with a workpiece supporting member of a pair of forming tools disposed at opposite sides of a workpiece supported in said member in opposed relation and adapted to shape the opposite faces of the workpiece, means for independently and collectively moving said tools over the faces of the workpiece, said last named means including means for guiding the tools through predetermined and independent curvilinear paths in the operation of shaping the same, means producing a definite movement of said tools relatively to each other and the workpiece in a working stroke of the machine, means for positioning different areas of the workpiece intermittently in the path of said tools and for retaining the workpiece supporting means against movement during the working stroke of said tools and means for varying the length of travel of the tools radially of the work and for gaging radial dimensions of the work comparably with such travel control and for controlling the movement of the tools toward and from the work in each travel.

37. In a machine of the class described, a rotatable workpiece supporting member, means for fractionally dividing the rotation of said member, the axis of said member passing perpendicularly through the vertex of a curved surface contemplated to be formed in a workpiece supported in said member, a pivot carrying frame movable for adjusting the distance of its axes with relation to said vertex and fractional rotation of the workpiece supported in said member, means for moving said frame and means correlated to the rotation of the workpiece supporting member to change the direction of movement of the axis of said frame.

38. In a machine of the class described, a workpiece supporting member, a pair of rods movably supported adjacent said member and including pivots alined on a common axis passing through a workpiece supported on said member, means for guiding said rods and pivots, a pair of sliding beam frames with beam ends connected to and movable with said pivots and guided to trace a primary path equal in direction and magnitude to the ordinates of a contemplated curvilinear path of said axis in its movement relatively to the workpiece, means for imposing on said beam ends a secondary movement equal in direction and magnitude to the abscissæ of the instantaneous positions of the resultant curvilinear path traveled by said axis, and means to limit said secondary movement of beam-ends for limiting the curvilinear path of said axis.

39. In a machine of the class described, means for transmitting power, two endless chains, means controlling the operation of said chains from said first named means, pivots alined on a common axis and in operative connection with said chains, a movable workpiece supporting member traversed by said axis, means for retaining said member in a plurality of different positions, and means for dividing an imparted motion to said chains into a two phase effect, one phase of its motion moving said pivots with respect to said member as required, and the second phase of its motion releasing the said retaining means and controlling the movement of said member.

40. The herein described method of forming workpieces having predetermined cross sectional curvature throughout the entire area of the finished product which consists in supporting a workpiece at its peripherial edge so that both radial surfaces thereof are fully exposed, arranging forming tools in position to engage opposite surfaces of said workpiece, moving said tools simultaneously in predetermined curved paths over said surfaces of the workpiece in a series of successive and intermittent radial working strokes, intermittently moving the workpiece to bring successive radial sections thereof into position to be fashioned by said tools until the entire area of both surfaces of the workpiece has been formed and guiding said tools in their respective movements over each section of the workpiece.

41. The herein described method of forming workpieces having predetermined cross sectional curvatures throughout the entire area of the finished product which consists in supporting a workpiece at its peripherial edge so that both radial surfaces thereof are fully exposed, arranging forming tools in position to engage opposite surfaces of the workpiece, moving said tools simultaneously in predetermined curved paths over said surfaces of the workpiece in a series of successive and intermittent radial working strokes, intermittently moving the workpiece to bring successive radial sections thereof into position to be fashioned by said tools until the entire area of both surfaces of the workpiece has been formed and guiding said tools in their respective movements over each section of the workpiece to produce on one face of the resulting product a concave surface and on the other face a convex surface.

42. The herein described method of forming workpieces having predetermined cross sectional curvature throughout the entire area of the finished product which consists in supporting a workpiece at its peripherial edge so that both radial surfaces thereof are fully exposed, arranging forming tools in position to engage opposite surfaces of the workpiece, moving said tools simultaneously in predetermined curved paths over said surfaces of the workpiece in a series of successive and intermittent radial working strokes, intermittently moving the workpiece to bring successive radial sections thereof into position to be fashioned by said tools until the entire area of both surfaces of the workpiece has been formed, guiding said tools in their respective movements over each section of the workpiece, and moving said tools in said paths through relatively independent arcs to vary the thickness of the resulting workpiece throughout the radial section traversed by said tools.

43. The herein described method of manufacturing the soundboards of stringed instruments having predetermined contour and cross sectional form throughout the entire area thereof, which consists in supporting a workpiece of substantially the outline of the soundboard to be made at its peripheral edge in such manner as to fully expose the entire area of both side faces of the workpiece to be carved, arranging oppositely disposed, collectively and independently moving carving tools on opposite sides of the workpiece to be formed, intermittently rotating the workpiece on a fixed axis located at a predetermined point on the workpiece to bring successive radial sections of the workpiece into position to be carved, moving said carving tools in a series of successive radial lines extending from said axis to the peripherial edges of the workpiece and carving said radial sections, guiding said tools in predetermined curved paths through each successive radial section of the workpiece and changing the curvature of the path of travel of the carving tools for each differential radial length of travel of said tools through the respective sections of the workpiece.

44. The herein described method of manufacturing the soundboards of stringed instruments having predetermined contour and cross sectional form throughout the entire area thereof, which consists in supporting a workpiece of substantially the outline of the soundboard to be made at its peripherial edge in such manner as to fully expose the entire area of both side faces of the workpiece to be carved, arranging oppositely disposed, collectively and independently moving carving tools on opposite sides of the workpiece to be formed, intermittently rotating the workpiece on a fixed axis located at a predetermined point on the workpiece to bring successive radial sections of the workpiece into position to be carved, moving said carving tools in a series of successive radial lines extending from said axle to the peripherial edges of the workpiece and carving said radial sections, guiding said tools in predetermined curved paths through each successive radial section of the workpiece and changing the curvature of the path of travel of the carving tools for each differential radial length of travel of said tools through the respective sections of the workpiece, and guiding said tools to produce varying and contrasting thicknesses through predetermined areas of the resulting product.

45. The herein described method of making articles of manufacture which consists in supporting a workpiece of predetermined outline in a machine by means attached to the peripherial edge of said workpiece in such manner as to fully expose the entire area of opposite faces of said workpiece and to arrange the same between a pair of oppositely disposed, collectively and independently movable forming tools, intermittently rotating the workpiece on an axis relatively fixed with respect to a predetermined point on the workpiece to bring different and successive radial sections thereof extending from said axis to the peripherial edge of the workpiece in alinment with the path of movement of said tools, moving said tools in radial lines corresponding to that of the radial sections on said workpiece, guiding said tools in relatively different arcs through the separate radial sections of the workpiece to produce a finished product of predetermined contour and cross sectional form throughout the entire area of the exposed faces thereof.

46. The herein described method of making articles of manufacture which consists in supporting a workpiece of predetermined outline in a machine by means attached to the peripherial edge of said workpiece in such manner as to fully expose the entire area of opposite faces of said workpiece and to arrange the same between a pair of oppositely disposed, collectively and independently movable forming tools, intermittently rotating the workpiece on an axis relatively fixed with respect to a predetermined point on the workpiece to bring different and successive radial sections thereof extending from said axis to the peripherial edge of the workpiece in alinement with the path of movement of said tools, moving said tools in radial lines corresponding to that of the radial sections of the workpiece to produce a finished product of predetermined contour and cross sectional form throughout the entire area of the exposed faces thereof and moving one of said tools through an arc contrasting to that traversed by the other tool in each radial stroke of said tools and with respect to the successive radial sections of the workpiece to produce varying and contrasting thicknesses throughout each radial section of the workpiece and with respect to the different radial sections.

47. In a machine of the class described, the combination with a workpiece supporting member, of a pair of forming tools arranged in opposed relation on opposite sides of a workpiece supported in said member, means for collectively moving and guiding said tools through the workpiece in curved paths of the conic sections, and said means comprising a kinematic chain involving a link system.

48. In a machine of the class described, the combination with a workpiece supporting member, of a pair of forming tools arranged in opposed relation on opposite sides of a workpiece supported in said member, means for collectively moving and guiding said tools through the workpiece in curved paths of the conic sections, said means comprising a kinematic chain involving a link system, means for supporting said tools for independent movement relatively to each other, and means for producing a definite movement of said tools relatively to each other.

49. In a machine of the class described, a workpiece supporting member and workpiece forming mechanism, means involving an oscillating frame for movably supporting said mechanism with reference to said member, means for moving said mechanism and oscillating frame and the oscillating frame axis relatively to the workpiece supporting member, and a kinematic chain comprising a link system for guiding said axis through curved paths of the conic sections.

50. In a forming machine of the class described employing a relatively fixed and rotary adjustable work supporting member, said member supporting a workpiece at its peripherial edge to expose the entire area of exposed side faces of said workpiece, forming devices arranged in opposed relation and on opposite faces of said workpiece, to fashion and expose the areas thereof, means for intermittently moving said devices in curvilinear paths in predetermined and successively adjacent sections of the opposed faces of the workpiece to fashion the entire area of both faces thereof to a predetermined cross sectional form, and means for intermittently moving said member relatively to said devices in proportionate relation to the width of the cut formed by said devices to bring adjacent sections of the workpiece supported therein successively into position to be fashioned by said devices.

51. In a machine of the class described, a pivoted lever frame and a frame sliding tangentially to the arc of swing of the pivoted frame, a link system coupling the adjacent ends of said frames and providing pivot means for an axis and slidable frame-ends for varying the lengths of said frames, and means involving a shaping tool for incorporating the centrode of said moving axis into a workpiece supported in the path of said axis.

52. In a machine of the class described, a workpiece-periphery supporting member rotatable on an axis and involving an open frame adapted to fully expose both surfaces of a workpiece thereon to the action of collectively and relatively movable forming tools disposed at each side of said frame, common means for causing said tools to travel the distance from said frame axis to the workpiece periphery in a plane radial to said axis and about an axis normal to such plane, said means involving a trace-defining mechanism governing the relative positions of the forming tools with respect to radial sections of the workpiece and with respect to radial sections of the workpiece and with respect to points on the contemplated elemental surfaces of such sections encountered by said travel, and means cooperating with said trace-defining mechanism for controlling the relative positions of the forming devices during said travel with respect to each other.

53. In a machine of the class described, a pivoted lever frame and a frame sliding tangentially to the arc of swing of the pivoted frame, a link system coupling the adjacent ends of said frames and providing pivot means for an axis and slidable frame-ends for varying the lengths of said frames, means for moving said pivot axis, a tracer-tool, movable supports for the tracer-tool adapted to maintain it reciprocably in the normal plane with respect to points on the centrode of said moving axis, and means constraining said tracer-tool to move in a path a gaged distance from said centrode.

54. In a machine for shaping surfaces to prescribed curvatures, a work support, two pivot means for two parallel axes, a double lever frame connected to pivot means of the first axis carrying a shaper tool and swingably supported upon pivot means of the second axis the relative distance of the two axes defining the lever-length on said lever frame; a kinematic chain for moving said pivot means and involving a curve-generating device for guiding the first axis in curves of the conics about the second axis and means defining the functional relation of the lever-lengths to points on the contemplated centrodes of the first axis; means in cooperation with last-named means for reciprocating said pivot means for the second axis in a direction toward and from the vertex of the first axis centrodes to vary said lever-length for coordinating the position of the second axis to the position of the first axis on points of its desired centrodes.

55. In a machine for shaping surfaces to prescribed curvatures, a work support, a double lever frame connected with one end to pivot means for a first axis carrying a shaper tool and adapted to swing upon pivot means for a second axis in the osculating plane of the respective curvature traced by said first axis during a workstroke, and the relative distance of the two axes defining the lever-length; a kinematic chain for moving said pivot means and involving a curve-generating device for guiding the first axis in curves of the conics about the second axis and means defining the functional relation of such lever-lengths to points on the contemplated centrodes of the first axis; means defining a definite segmental part of said lever-length equal to the initial lever-length in a workstroke of said lever frame, means in cooperation with last-named means for positioning said second axis pivot means at an initial lever-length from the vertex points on said first axis centrodes and releasable locking means for retaining said two pivot means in predetermined relative positions on the lever frame throughout the workstroke.

56. In a machine for shaping surfaces to prescribed curvatures, a work support, movable pivot means providing an axis, means for moving and guiding said pivoted axis in definite paths, a shaping tool, movable supports for the shaping tool and adapted to maintain said shaping tool reciprocably in the normal plane with respect to points on the centrode of said guided axis, said supports including a frame oscillatably carried by said pivot means and a tool support slidably carried by said frame and adapted for a reciprocating movement to vary the radial distance of the shaping tool from said axis.

57. In a machine for shaping surfaces to prescribed curvatures, a work support, movable pivot means providing an axis, means for moving and guiding said pivoted axis in definite paths, a shaping tool, movable supports for the shaping tool and adapted to maintain said shaping tool reciprocably in the normal plane with respect to points on the centrode of said guided axis, said supports including a frame oscillatably carried by said pivot means and a tool support slidably carried by said frame and adapted for a reciprocating movement to vary the radial distance of the shaping tool from said axis, and means for definitely limiting such reciprocating movement of the tool in one of its directions and for yieldably reacting against it in the other direction.

58. In a machine for shaping surfaces to prescribed curvatures, a work support, movable pivot means providing an axis, means for moving and guiding said pivoted axis in definite paths, a shaping tool arranged for rotation upon an adjustable axis, movable supports for the shaping tool and adapted to maintain said shaping tool reciprocably in the normal plane with respect to points on the centrodes of said guided axis, said supports including a frame oscillatably carried by said pivot means and a tool support slidably carried by said frame and adapted for a reciprocating movement to vary the radial distance of the shaping tool from said pivoted axis, and means on said slidable tool support for varying the direction of the axis of rotation of said shaping tool.

59. In a machine for shaping surfaces to prescribed curvatures, the combination of a work support, pivot means for two axes, means defining the functional relation of the two axes to contemplated centrodes of one of said two axes, a kinematic chain in cooperation with last-named means for moving said pivot means in definite relative positions and for guiding the first axis in curves of the conics about the second axis; a shaping tool supported upon pivot means of the first axis and adapted for rotary movement about and reciprocating movement toward and from said first axis.

60. A machine for shaping surfaces to prescribed curvatures, including in combination, a work support, primary curve-generating means involving a link system and a pivoted axis for moving and guiding such pivoted axis in curved paths of the conics through a workpiece supported on said work support; secondary curve-generating means in cooperation with said primary generating means for superimposing on the centrodes of said guided axis secondary curves of a desired form, and shaping tools oscillatably carried by the pivots of said axis for incorporating so resulting curves into a workpiece.

61. A machine for shaping surfaces to prescribed curvatures, including in combination, a work support, two movable pivot means for a first and a second axis, a kinematic chain for moving said pivot means and involving means defining the functional relation of said two axes and a curve-generating device for guiding the first axis in curves of the conics about the second axis and in planes normal to said axes, reciprocable supporting means for pivot means of second axis and adapted for movement toward and from the vertex of the first axis-centrodes for changing the course of the first axis, and shaping tools oscillatably carried by the pivot means of first axis for incorporating the centrodes of said first axis into a workpiece supported on work support.

62. A machine for shaping surfaces to prescribed curvatures, including in combination, a work support, two pivot means for a first and a second axis, a kinematic chain for moving said pivot means and involving means for defining the functional relation of said two axes and a curve-generating device for guiding the first axis in curves of the conics about the second axis and in planes normal to said axes; reciprocable supporting means for the pivot means of the second axis and adapted for movement towards and from the vertex of the first axis-centrodes for changing the course of the first axis, secondary curve-generating means in cooperation with first named generating means for superimposing on the centrodes of said first axis secondary curves to produce resultant curves of a desired form, and shaping tools oscillatably carried by the pivot means of first axis for incorporating the so resulting curves into a workpiece supported on said work support.

63. In a machine for shaping surfaces to prescribed curvatures, a lever frame, two pivot means for two axes movably connected to the lever frame and the relative distance between the two axes defining the lever-lengths; a kinematic chain involving said lever frame and pivot means for guiding the first pivoted axis from initial to limiting points of position about the second axis; means cooperating with said guiding means for defining the functional relation of said lever-lengths to contemplated first-axis-centrodes and points thereon; indicating means for indicating the position of the second-axis-pivot on said lever frame and involving an outline frame of substantially the outline of the contemplated surface, a cam of curvature defining the relation of said lever-lengths to said first-axis-centrodes and means cooperating with said outline frame and said cam for indicating the limiting positions of the first axis on its centrodes and the corresponding positions of the pivoted second axis on the lever frame.

64. In a machine for shaping surfaces to prescribed curvatures, a lever frame, two pivot means for two axes movably connected to the lever frame and the relative distance between the two axes defining the lever-lengths; a kinematic chain involving said lever frame and pivot means for guiding the first pivoted axis from initial to limiting points of position about the second axis; means cooperating with said guiding means for defining the functional relation of said lever-lengths to contemplated first-axis-centrodes and points thereon; indicating means for indicating the position of the second-axis-pivot on said lever frame and involving an outline-frame of substantially the outline of the contemplated surface, a cam of curvature defining the relation of said lever-lengths of said first-axis-centrodes and including a spiral-cam and means cooperating with said outline frame and said cam for indicating the limiting positions of the first axis on its centrodes and the corresponding positions of the pivoted second axis on the lever frame.

65. In a machine for shaping surfaces to prescribed curvatures, a kinematic chain linking power source to the various feed and control mechanisms of the machine and embracing a pair of rods as elements in the chain and means for reciprocating said rods; movable pivots alined on a common axis supporting a shaping tool, said pivots being in operative engagement for travel with said rods for feeding the tool through the work; a movable workpiece supporting member traversed by said axis; and means carried by said rods and said pivots for actuating the feed and control mechanisms of the machine in predetermined sequence by the movements of said rods.

66. In a machine for shaping surfaces to prescribed curvatures, in combination, a work support, movable pivot means providing an axis traversing said work support and a support for an oscillating frame; means for moving and guiding said pivot means and the axis of said oscillating frame in definite paths; means connecting the oscillating frame to said guiding means so as to maintain said frame in the normal plane with respect to points on the centrode of said moving axis; a slidable shaper tool support arranged on the frame for movement towards and from the pivoted axis and involving a bar tranverse to said frame, spindles supporting said bar and slidably mounted on the frame and a ring centrally disposed on the bar; a rotatable cutter tool and a housing for the cutter tool rotatably supported by said ring and upon a shaft arranged on the frame for both rotary and axial movement; a kinematic drive chain connecting cutter to power source and including said shaft and a drive pulley supported upon said pivot means.

In testimony that I claim the foregoing as my invention I have signed my name this 11th day of Sept., 1928.

LOUIS GRUBER.